(12) United States Patent
Ozguner et al.

(10) Patent No.: US 10,338,816 B2
(45) Date of Patent: *Jul. 2, 2019

(54) REDUCING NEGATIVE EFFECTS OF INSUFFICIENT DATA THROUGHPUT FOR REAL-TIME PROCESSING

(71) Applicant: MICROSOFT TECHNOLOGY LICENSING, LLC, Redmond, WA (US)

(72) Inventors: Tolga Ozguner, Redmond, WA (US); Ishan Jitendra Bhatt, Sunnyvale, CA (US); Miguel Comparan, Kenmore, WA (US); Ryan Scott Haraden, Duvall, WA (US); Jeffrey Powers Bradford, Woodinville, WA (US); Gene Leung, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,384

(22) Filed: Oct. 8, 2018

(65) Prior Publication Data
US 2019/0050149 A1   Feb. 14, 2019

Related U.S. Application Data

(63) Continuation of application No. 15/456,425, filed on Mar. 10, 2017, now Pat. No. 10,095,408.

(51) Int. Cl.
*G06F 12/00* (2006.01)
*G06F 3/06* (2006.01)

(52) U.S. Cl.
CPC ............ *G06F 3/0604* (2013.01); *G06F 3/061* (2013.01); *G06F 3/0634* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,223,235 B1 * | 4/2001 | Cheng | G06F 3/061 710/107 |
| 2015/0134784 A1 * | 5/2015 | De Vleeschauwer | H04L 65/605 709/219 |

(Continued)

*Primary Examiner* — Jason W Blust
(74) *Attorney, Agent, or Firm* — NovoTechIP International PLLC

(57) ABSTRACT

Techniques for controlling access to a memory are provided. The techniques may include receiving and storing output pixel data in a buffer, providing the stored output pixel data to a display controller, receiving stored output pixel data from the buffer at the display controller, switching to a second operating mode state based at least on an amount of available data in the buffer being less than or equal to a threshold, identifying a portion of the image data stored in a memory device for use in generating output pixel data for an updated image, and, in response to operating in the second operating mode, generating the output pixel data without issuing a memory read command via an interconnect to retrieve the portion of the initial image while operating in the second operating mode, and providing the output pixel data to the buffer.

20 Claims, 15 Drawing Sheets

(56) References Cited

U.S. PATENT DOCUMENTS

2016/0268005 A1\* 9/2016 How ......................... G06F 5/06
2017/0168755 A1\* 6/2017 Lo .......................... G06F 3/0659

\* cited by examiner

REDUCING NEGATIVE EFFECTS OF INSUFFICIENT DATA THROUGHPUT FOR REAL-TIME PROCESSING

REFERENCE TO A RELATED APPLICATION

This application claims the benefit of priority from pending U.S. patent application Ser. No. 15/456,425, filed on Mar. 10, 2017, and entitled "Reducing Negative Effects of Insufficient Data Throughput for Real-Time Processing," which is incorporated by reference herein in its entirety.

BACKGROUND

Dynamic random access memory (DRAM) devices are used across a wide range of electronic devices. In many such electronic devices, for efficiency reasons, DRAM devices are shared by many different components that can generate read and/or write traffic to the DRAM devices. Although DRAM devices offer substantial bandwidth and throughput, competing demands and/or device access patterns (for example, reading/writing and/or accesses to different pages or banks) can significantly increase latency and/or significantly reduce throughput experienced by a particular requester of memory. Even within an individual component, such as a dedicated graphics processing unit (GPU), there may be multiple subcomponents with competing and/or concurrent demands for memory bandwidth. In some cases, even where a dedicated DRAM device is allocated to a single component or subcomponent memory access patterns, short term increases in throughput demands, and/or short term slowdowns in processing can create short term performance degradation. Additionally, DRAM devices periodically perform refresh operations, during which their content is not accessible. Such issues may be more significant for mobile electronic devices which, for reasons such as improving battery life, reducing device production cost, and/or reducing device complexity, operate with lower total DRAM throughput in general than in non-mobile devices.

Such uncertainty and variability in memory latency and/or throughput can lead to not meeting real-time deadlines for providing data to components relying on rapid retrieval of data from a DRAM device. Although buffering has been used to reduce sensitivity to short-term decreases in memory bandwidth and throughput, a buffer may still experience "underflow" as a result of a significant decrease in throughput, leaving a requesting real-time data sink without needed data. This is particularly true for low latency real-time applications. Previous approaches, involving recovering from underflow and generating substitute data while recovering from underflow, generally result in large-scale corruption in output due to extended recovery time (for graphics output, such approaches result in large and obvious areas of a frame being corrupted and/or repeated or dropped frames), and wasted memory bandwidth to fetch data for already-underflowed outputs.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Systems and methods for controlling access to a memory to reduce negative effects of insufficient data throughput for real-time processing are disclosed herein, to address the challenges described above.

Figure 1:
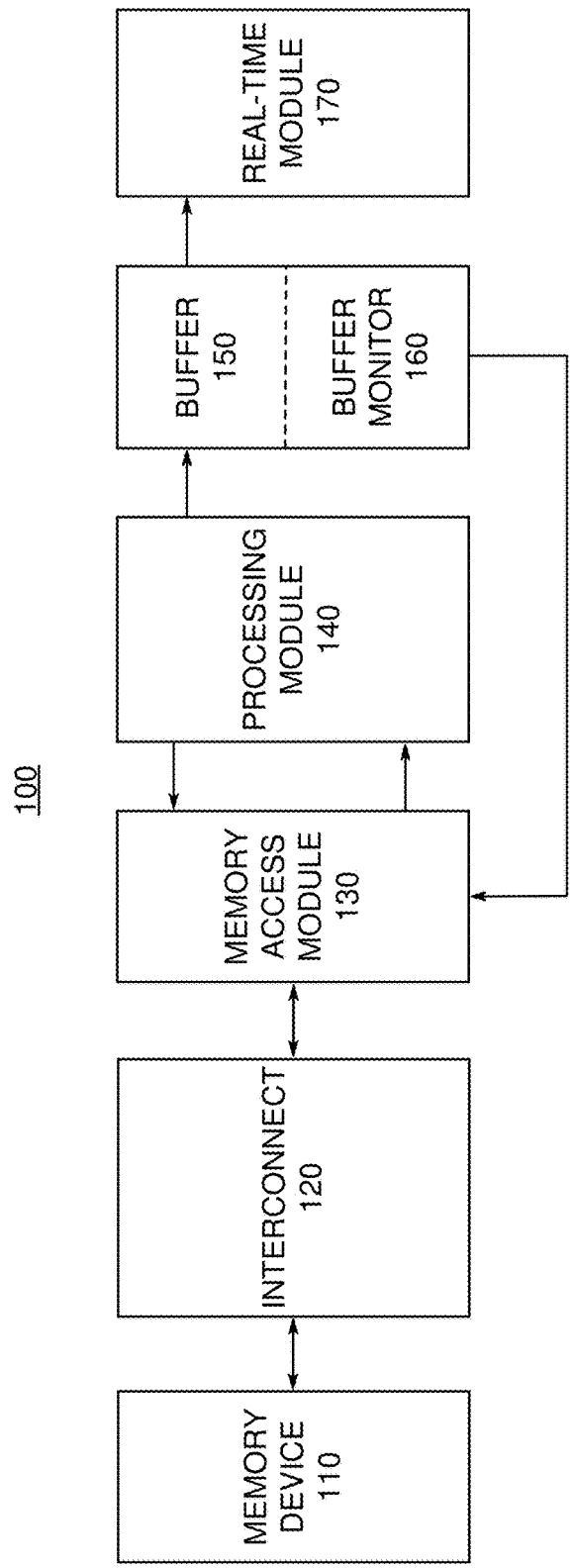
FIG. 1 is a schematic diagram illustrating features included in an example system configured to control access to a memory to reduce negative effects of insufficient data throughput for real-time processing.

FIG. 1 is a schematic diagram illustrating features included in an example system 100 configured to control access to a memory to reduce negative effects of insufficient data throughput for real-time processing. Memory device 110 is arranged to store data for subsequent retrieval and processing by the processing module 140. The memory device 110 may also simply be referred to as a "memory." Memory device 110 is further arranged to receive memory read commands, for example, a memory read command specifying an address and an optional length, via interconnect 120 (in some implementations, via a dedicated command bus), and provide data stored in the memory device 110 corresponding to a memory read command via interconnect 120. Memory device 110 may be further arranged to receive and store data responsive to memory write commands and corresponding data received via interconnect 120.

In some implementations, memory device 110 includes one or more DRAM devices (such as, but not limited to, DDR2, DDR3, DDR4, DDR5, GDDR5, or GDDR5X SDRAM). Memory device 110 may include non-DRAM volatile or nonvolatile memory devices. The structure and operation of DRAM devices makes latency and throughput dependent on access patterns, and as a result unpredictable. The DRAM devices may be configured as arrays of "pages," each page containing a number of memory cells (for example, between 8 kilobits and 16 kilobits per page). The pages may be arranged in rows and columns, and further grouped into banks, each bank containing tens of thousands of pages. A page in the DRAM device may be open or closed. In most memory controllers, only one page may be open in a bank at a time. To switch from a currently open page to a new page, a "page close operation" must be performed for the currently open page, followed by a "page open operation" to open the new page. During these page close and page open operations, the pages in a bank cannot be accessed. Thus, changing pages increases latency (by at least the time to perform the page close and page open operations) and reduces throughput (by reducing the amount of time data can be transferred). Further, if a write command follows a read command, there is a "read to write bus turnaround," delaying the write command to avoid a data hazard resulting from a conflict in the use of a memory data bus that increases latency and reduces throughput. There is also a similar "write to read bus turnaround" for a read command following a write command, to allow write data to be stored in a DRAM device before returning read data on the same data bus or interconnect. Additionally, DRAM devices require frequent refresh operations, during which all read and write operations to all banks of a DRAM device are suspended, all open pages are closed, and refresh commands are processed. The need to perform this frequently can make latency for individual memory access unpredictable for real-time applications.

Figure 3:
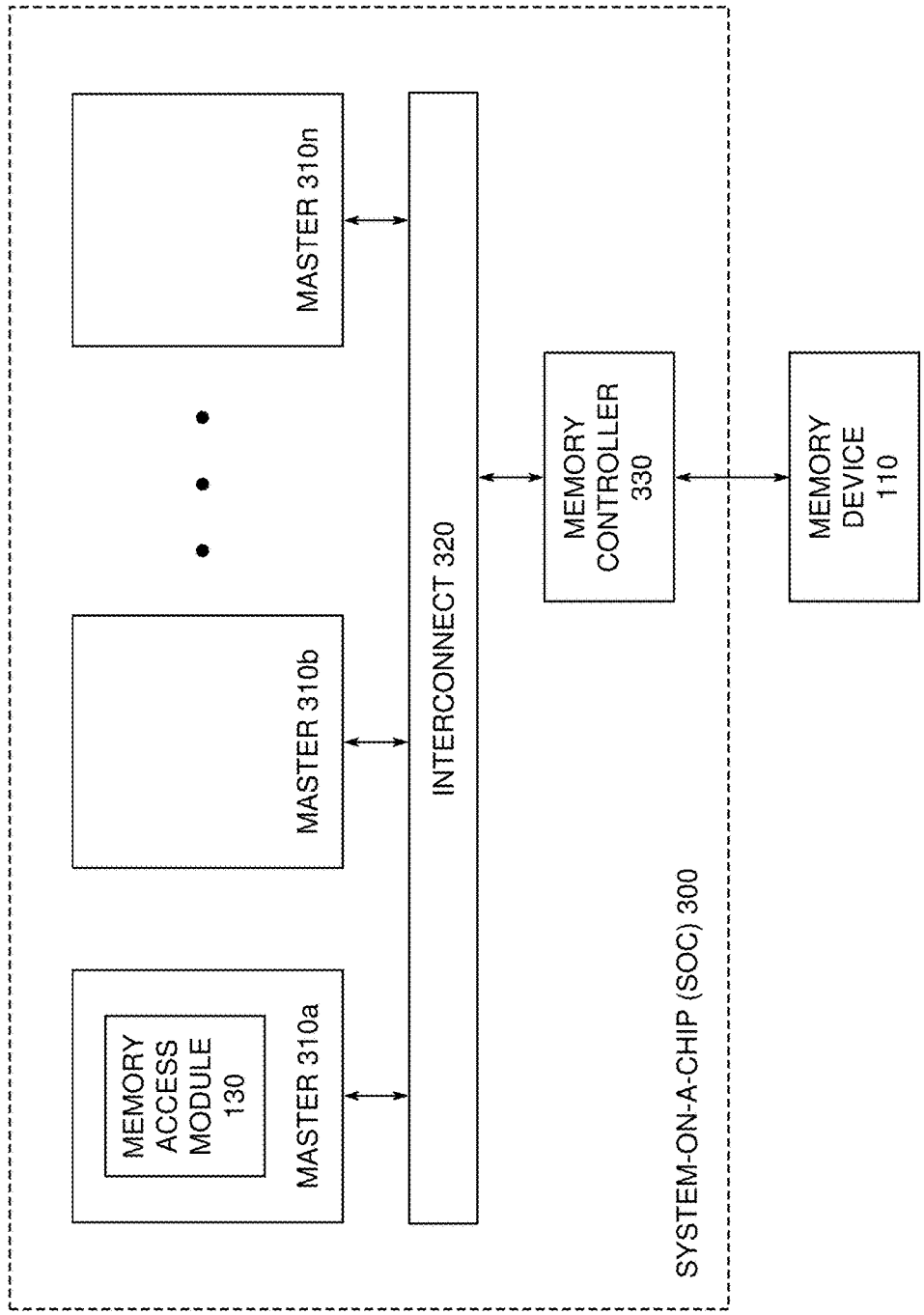
FIG. 3 is a schematic diagram illustrating features included in an implementation of the system illustrated in FIG. 1 in which a memory controller controls accesses to the memory device by multiple masters, including a first master that includes the memory access module illustrated in FIGS. 1 and 2.

Even in implementations in which memory access module 130 is given exclusive access to a portion or all of the DRAM devices, including, for example, exclusive access for one or more periods of time, such that memory accesses by other components of system 100 do not affect latency or throughput for memory access module 130, various events and/or conditions can nevertheless lead to possible underflow of buffer 150. In implementations in which the DRAM devices are also accessed by other components of system 100, much as illustrated in FIG. 3, memory access module 130 may experience increased latency and reduced throughput resulting from access patterns of the other components, which can provoke underflow of buffer 150. Furthermore, where memory device 110 (whether DRAM or other technology) is accessed by other components of system 100, contention among those components and memory access module 130 and/or scheduling approaches by a coordinating memory controller (for example, prioritizing same-page memory accesses to improve overall throughput) can result in substantial and/or unpredictable delays in initiating memory accesses requested by memory access module 130.

Figure 10:
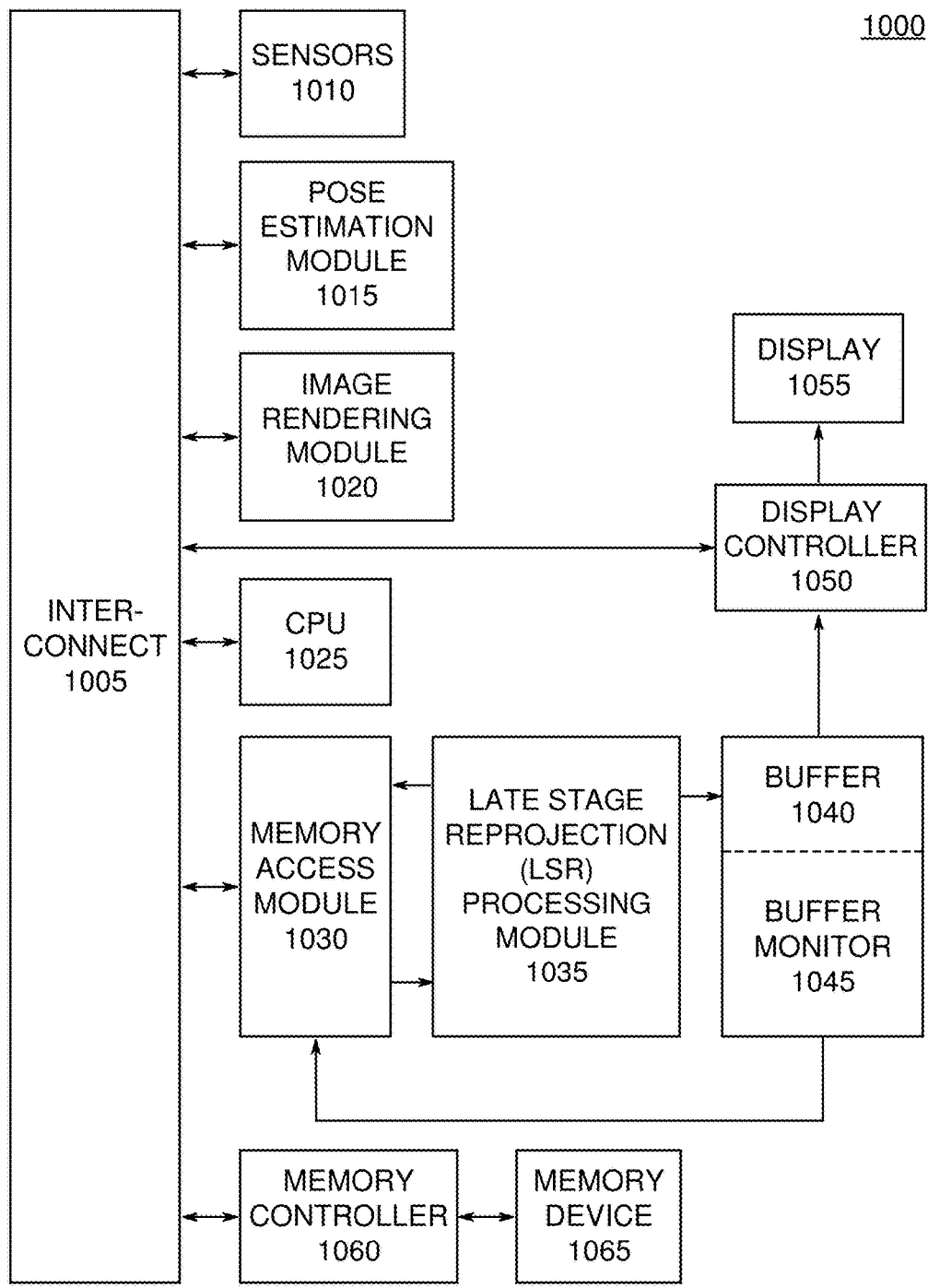
FIG. 10 is a schematic diagram illustrating features included in an example system arranged to control access to a memory to reduce negative effects of insufficient data throughput for real-time late stage reprojection (LSR) of an initial rendered image for display via a display controller.

Interconnect 120 provides memory access module 130 with access to memory device 110, and includes circuitry arranged for such access. In some implementations, referring to FIG. 2, interconnect 120 may provide a direct connection between memory device 110 and memory access module 130, in which case memory interface 240 includes circuitry specific to interoperating with the memory device 110 to allow memory access module 130 to retrieve data stored in memory device 110 at selected addresses. In some implementations, as illustrated in FIGS. 3 and 10, interconnect 120 may include a memory controller arranged to retrieve data stored in memory device 110 in response to memory read commands received from memory access module 130. Interconnect 120 may include topologies such as, but not limited to, buses, rings, meshes, point-to-point, or network-on-chip (NoC).

Memory access module 130 is arranged to receive memory read requests from processing module 140 and is configured to, depending on a mode in which memory access module 130 is operating, retrieve corresponding data from memory device 110 and respond to the memory requests with the retrieved data (see, for example, FIG. 4), although memory access module 130 may respond to memory read requests in other ways (see, for example, FIGS. 5-9). Memory access module 130 is arranged to receive one or more indications from buffer monitor 160 as to an amount of available data in buffer 150 and switch the mode in which it is operating (see, for example, FIGS. 5-9) in response to one or more indications received from buffer monitor 160.

Processing module 140 is configured to generate and issue memory read requests to memory access module 130 to obtain data from the memory device 110, receive corresponding responses to the issued memory read requests, and process the responses to generate output data for real-time module 170 (via buffer 150). In some implementations, there may be multiple processing modules 140, each also configured to generate and issue memory read requests to memory access module 130 to obtain data from the memory device 110, receive corresponding responses to the issued memory read requests, and process the responses to generate output data for real-time module 170 (via buffer 150). In such implementations, memory access module 130 would also be arranged to receive the memory read requests and provide corresponding responses. In some implementations, processing module 140 may include multiple sub-modules configured to generate and issue memory read requests to memory access module 130 to obtain data from the memory device 110, receive corresponding responses to the issued memory read requests, and process the responses to generate output data for real-time module 170 (via buffer 150). For example, for processing color image data, processing module 140 may include three sub-modules: a first sub-module for processing red channel image data, a second sub-module for processing green channel image data, and a third sub-module for processing blue channel image data. In some implementations, some or all of the processing module 140 may be implemented using hardwired or fixed logic, finite state machines, and/or other circuits that does not execute program instructions. In some implementations, processing module 140 may be configured to process program instructions, which may be received in whole or in part via the memory read requests issued to memory access module 130 or via another memory (for example, a firmware or another program for processing module 140), to generate output data.

Buffer 150 is arranged to receive and store the output data generated by processing module 140, and to provide the stored output data to the real-time module 170. Buffer 150 may also be referred to as an "output buffer," an "output data buffer," an "output memory," or an "output data memory." In some implementations, buffer 150 is arranged to serve as a "first in, first out" (FIFO) buffer for groups of output data, with groups of output data being provided to real-time module 170 from buffer 150 (with buffer 150 providing each group of output data to real-time module 170 via one or more transfers) in the same order that buffer 150 received the groups of output data from processing module 140 (with buffer 150 receiving the groups of output data from processing module 140 via one or more transfers). Such ordering for transferring output data via buffer 150 facilitates accurately assessing an amount of available data in buffer 150. In such implementations, a size, number, and/or order of transfers or portions included in each transfer used to receive a group of output data from processing module 140 may be different than a size, number, and/or order of transfers or portions included in each transfer used to provide the same group of output data to real-time module 170. In a first example, processing module 140 may provide an 8 byte group of output data to buffer 150 in a single transfer of 8 bytes, but buffer 150 may provide that same group of output data to real-time module 170 in four transfers of 2 bytes (for example, each transfer may be sample data for a 16-bit DAC included in real-time module 170). In a second example, real-time module 170 may be a display controller adapted to receive 640 pixel wide horizontal scan lines from buffer 150, and processing module 140 may be arranged to perform row-by-row tiled rendering with tiles of 32×32 pixels; in this example, each group of output data may be a 640×32 pixel horizontal row of tiles, with buffer 150 receiving 20 transfers of 32×32 pixel tiles from processing module 140 and buffer 150 providing 32 transfers of 640 pixel wide horizontal scan lines to real-time module 170. There are many techniques for buffer 150 to implement storing and retrieving data, including, but not limited to, a ring buffer, a queue implemented using flip flops or latches, SRAM or other memory, linked lists, and/or gather-scatter or other indirect addressing techniques.

Buffer monitor 160 is arranged to determine an amount of available data currently in buffer 150 and compare the determined amount of available data against one or more thresholds. In some implementations, a portion of buffer monitor 160 may be included in memory access module 130. Buffer monitor 160 may be implemented as a buffer monitoring circuit. The amount of available data may be measured in various units including, but not limited to, bits, bytes, words, lines, tiles, blocks, or groups (referring to the groups discussed above in connection with buffer 150). The amount of available data may be determined based on: (1) an amount of output data received from processing module 140 and/or stored by buffer 150 that has not yet been provided to real-time module 170 (although, if buffer 150 conveys output data in groups as mentioned above, the resulting amount may include output data that cannot yet be provided to real-time module 170), or (2) an amount of output data stored in buffer 150 that can be provided to real-time module 170 (although, if buffer 150 has received some, but not all, of the output data for a group, the resulting amount will not reflect the partially received group). The amount may be increased in response to receiving or storing output data from processing module 140 and may be decreased in response to providing stored output data to real-time module 170.

Buffer monitor 160 uses a first threshold to determine if buffer 150 is in an "underflow approaching" state, which may also be referred to as an underflow approaching condition and/or "imminent underflow" state or condition. The first threshold has a non-zero value corresponding to the buffer 150 still having available data or not being empty, but the value corresponds to an amount of available data that is low enough to suggest underflow of buffer 150 may occur if action (such as, but not limited to, a change in operation or configuration of the system 100) is not taken. Various circumstances can lead to an underflow approaching state for buffer 150 (and actual underflow of buffer 150, if left unchecked). For example, throughput of output data from processing module 140 may have decreased for reasons such as, but not limited to, temporary increases in latency for reading memory device 110 via memory access module 130 (for example, due to contention for accessing memory device 110 with other components of system 100), slowed operation of processing module 140 (for example, due to a temporary increase in complexity), and/or an increased demand by processing module 140 for data from memory device 110 (for example, processing of a portion of an image requiring a large number of textures). Additionally, in some implementations or configurations, latency and/or throughput demands by real-time module 170 may increase significantly. For example, if real-time module 170 is a display controller, much as illustrated in FIG. 10, an increase in frame rate or display resolution would have a corresponding increase in the demand for output data throughout via buffer 150, and reducing tolerable margins for variations in latency and/or throughput. Buffer monitor 160 is configured to, in response to the amount of available data in buffer 150 being less than or equal to the first threshold, output an underflow approaching state indication (or "underflow approaching indication") to memory access module 130. This indication may be output as, for example, a level of a binary signal (for example, a binary signal may have a value of '1' whenever the amount of available data less than or equal to the first threshold) or a value encoded in a signal and/or written in a storage element (with the value reflecting various conditions of buffer 150). As illustrated in FIGS. 5, 6, 8, and 9, buffer monitor 160 may use additional thresholds do identify other states or conditions for buffer 150, and corresponding indications may be output and provided to memory access module 130 or other components included in system 100. The first threshold and/or additional thresholds may be set and/or changed via a configuration register or other memory writable by a computer processor and/or automatically adjustable by buffer monitor 160. Buffer monitor 160 may automatically scale the first threshold and/or additional thresholds in accordance with an estimated bandwidth and/or rate of demand for real-time module 170. For example, if real-time module 170 is a display controller an increase in frame rate or resolution may result in a linear increase in the thresholds.

Real-time module 170 has, at least for some periods of time, repeated and ongoing deadlines for receiving input data from buffer 150 in order to have fresh data for one or more real-time operations. In an event that buffer 150 is unable to provide an amount of stored output data to meet a deadline, real-time module 170 cannot simply wait for buffer 150 to receive more output data from processing module 140. A non-limiting example of such real-time operations is receiving pixel data for delivery to a display. A display controller (such as display controller 1050 illustrated in FIG. 10) demands, for each pixel in each frame, respective pixel data on a rigid and strict schedule. If output data from processing module 140 is not available when needed, other pixel data (for example, pixel data for a blank pixel, pixel data for a predetermined color, repeated pixel data (for example, a last received valid pixel data), or otherwise "manufactured" pixel data) must replace it. In some implementations, a display controller may respond to an underflow of buffer 150 by repeating a previously received frame rather than display invalid pixel data or attempt to cope with missing pixel data. As illustrated by this example of a display controller, underflow of buffer 150 can result in a degraded end user experience (repeated/skipped frames, and/or frames with invalid pixel data). Furthermore, as discussed previously, some real-time modules have substantial and unrelenting throughput and/or latency requirements which, making underflow difficult to escape and easily reentered when applying conventional underflow handling techniques. Operation of real-time module 170 may be asynchronous from operation of processing module 140, including operation in different clock domains.

Figure 2:
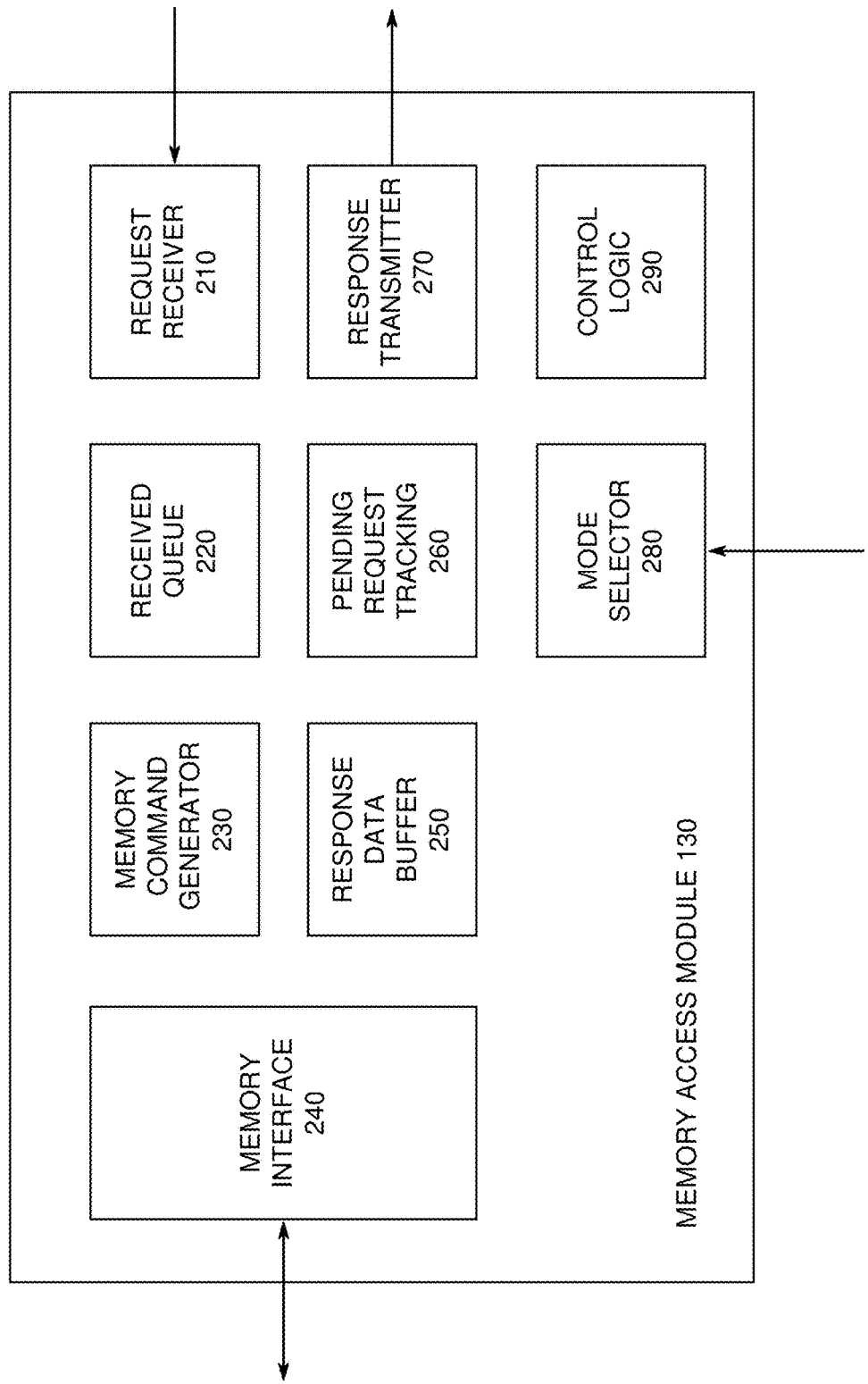
FIG. 2 illustrates examples of features included in the memory access module illustrated in FIG. 1.

FIG. 2 illustrates examples of features included in the memory access module 130 illustrated in FIG. 1. Various interconnections among the illustrated features have been omitted for the convenience of illustration, but should be understood to be present based on other portions of this disclosure. FIG. 2 relates to certain implementations of the techniques discussed in this disclosure, but is not intended to limit the scope of the disclosure or the claims to only such implementations.

Memory request receiver 210 receives memory requests issued by processing module 140, such as memory read requests requesting data from memory device 110. In some implementations, these memory requests may be delivered to memory access module 130 via a shared memory shared by processing module 140 and memory access module 130, memory mapped input/output (MMIO), and/or a "doorbell" mechanism. Each memory read or write request includes a portion identifier, such as, but not limited to, a resource identifier (for example, an object identifier) or an address (physical or virtual), that may be used to identify a portion (contiguous or noncontiguous) of the memory device 110 corresponding to the memory request. A memory request may also include a request identifier that may be used to cross-reference an eventual response to the memory request, although in some implementations the portion identifier may be used for this purpose.

As discussed in connection with FIG. 7, below, some implementations may include a received queue 220 arranged to store or otherwise track memory requests received via request receiver 210 prior to issuing any corresponding memory commands via memory interface 240. Received queue 220 provides a convenient mechanism for identifying memory requests that have not been pursued, as is done in operations 736 and 740 in FIG. 7. In some implementations, request receiver 210 may first provide a received memory request to memory command generator 230 to generate one or more corresponding memory commands, and store or otherwise track the generated memory commands in the received queue 220. Memory requests stored in received queue 220 may be reordered to prioritize or deprioritize memory requests, or to optimize an order or locality of memory commands.

Figure 4:
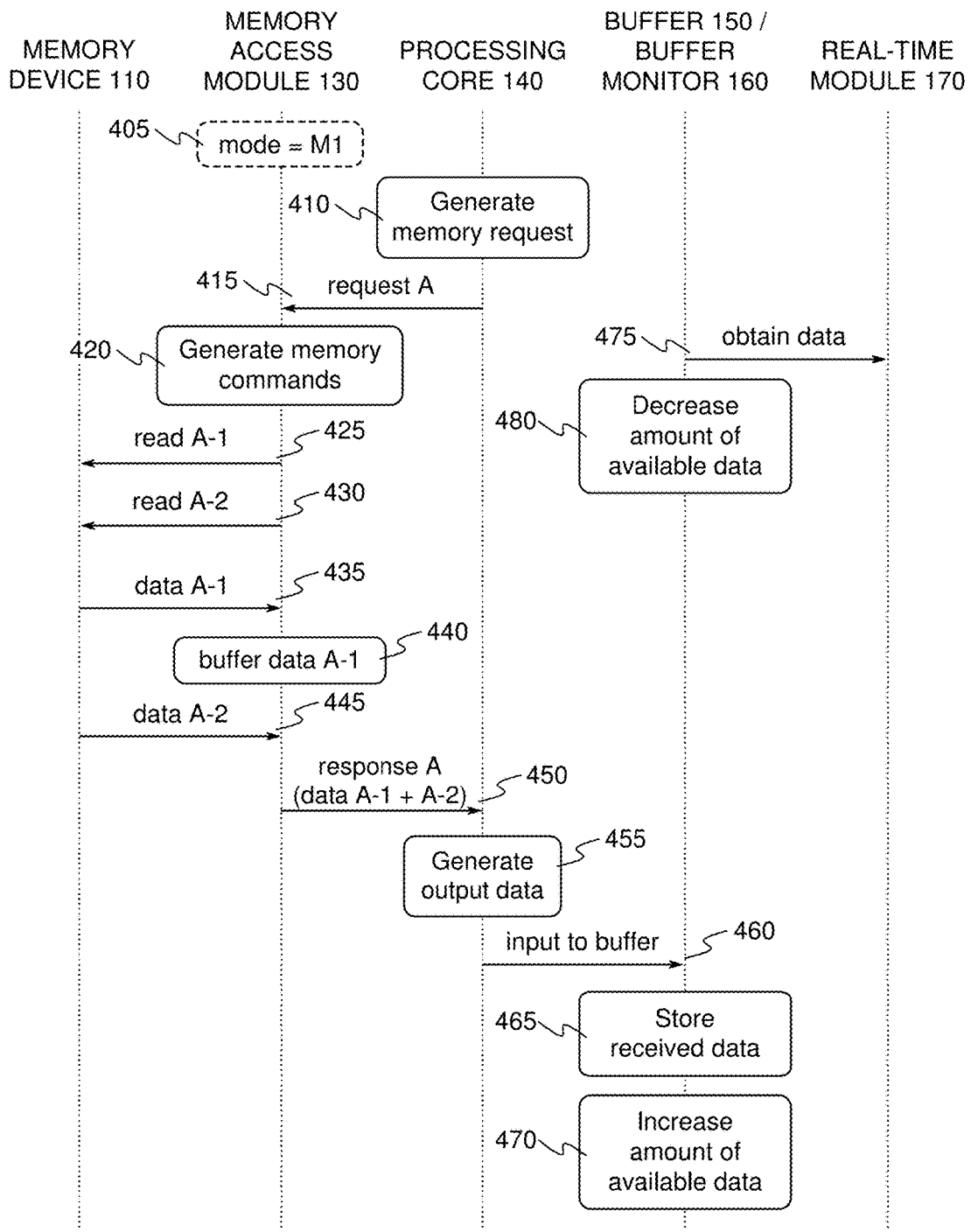
FIG. 4 illustrates an example of interactions among, and operation of, the features illustrated in FIG. 1 in which the memory access module remains in a first mode and retrieves data from the memory device for memory requests received from the processing module.

Memory command generator 230 is arranged to convert a memory request into one or more corresponding memory commands. This may include identifying one of more data regions (contiguous or noncontiguous) in memory device 110 that correspond to a portion identifier included in the memory request. Such identification may include translating an object identifier or a virtual address into one or more corresponding physical addresses. In some implementations, such translation may be performed by memory interface 240 or a memory controller (for example, the memory controller 330 illustrated in FIG. 3). As an example, for a processing module 140 that processes pixel data stored in memory device 110 as tiles (for example, tiles of 16×16 pixels or 32×32 pixels), a memory read request may specify a tile identifier or a tile address, and memory command generator 230 may generate a plurality of memory read commands to retrieve the associated data from memory device 110. FIG. 4 illustrates an example, in which operation 420 identifies two data regions, A-1 and A-2, that correspond to the request A received at 415. Memory command generator 230 may also be arranged to validate memory requests, such as, but not limited to, denying access to various address regions.

Memory interface 240 is arranged to interface with interconnect 120 for accessing memory device 110 to issue memory commands, such as memory read or memory write commands, corresponding to memory requests received via request receiver 210, and receive data retrieved from memory device 110 for completed memory read commands. Memory interface 240 may be configured to coordinate with pending request tracking module 260 to track and manage "pending" memory requests for which at least one memory command has been issued and at least one memory command remains to be completed, and their respective memory commands. Memory interface 240 may be configured to coordinate with received queue 220 and/or memory command generator 230 to obtain new memory commands to issue as other memory commands are completed.

Some implementations may include response data buffer 250 to store data retrieved from memory device 110 for memory read requests. In some implementations, response data buffer 250 may be included in or provide a shared memory shared by processing module 140 and memory access module 130 to avoid copying the retrieved data, with a response to a corresponding memory read request indicating where processing module 140 may find the retrieved data in the shared memory.

Pending request tracking module 260 is arranged to track and manage "pending" memory requests for which at least one memory command has been issued and at least memory command remains to be completed. Pending request tracking module 260 also provides a convenient mechanism for identifying memory read requests for which data has been requested but not yet received, as is done for operation 624 in FIG. 6.

Figure 5:
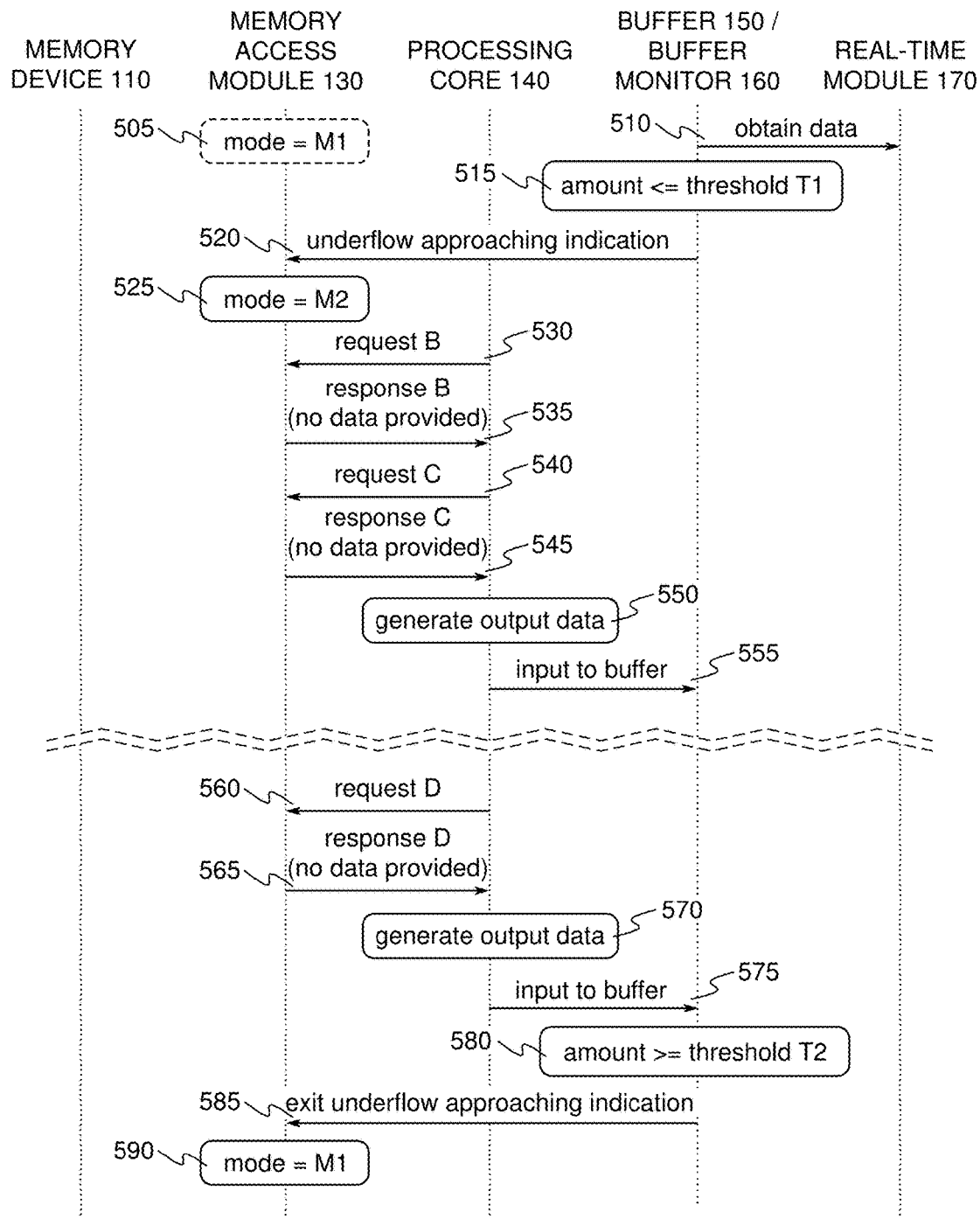
FIG. 5 illustrates an example of interaction among, and operation of, the features illustrated in FIG. 1, in which the memory access module temporarily operates in a second mode in which it responds to one or more memory requests from the processing module by indicating that the memory access module did not attempt to retrieve corresponding data from the memory.

Mode selector 270 is adapted to receive one or more indications from buffer monitor 160 as to the amount of data currently available in buffer 150 (for example, the underflow approaching indication discussed above, or other indications described herein) and select an operating mode in response to the received indications. Initially and ordinarily, mode selector 270 selects a first mode (for example, mode M1 illustrated in FIG. 4), which may be referred to as a "normal" operating mode for memory access module 130, in which memory access module 130 does not respond to a memory read request until all of its corresponding data is received. As illustrated in FIG. 5, in response to receiving an indication from buffer monitor 160, mode selector 270 may switch to a second mode, in which memory access module 130 will respond to a memory read request without waiting for, or even requesting, corresponding data from memory device 110. Mode selector 270 may return to the first mode in response to receiving an indication from buffer monitor 160 that an amount of available data in buffer 150 is equal to or greater than a threshold, as illustrated in FIG. 5, or in response to a predetermined period of time elapsing since switching to another mode.

Response transmitter 280 is arranged to generate responses to memory requests and provide the generated responses to processing module 140. When memory access module 130 is operating in the first mode mentioned above, once all data for a memory read request has been received from memory device 110, a corresponding response, providing the retrieved data, is generated and provided to the requesting processing module 140. When memory access module 130 is operating in the second mode mentioned above, a response for a memory read request may be generated and provided to the requesting processing module 140, prior to retrieving all of the corresponding data from memory device 110 or even issuing any memory read commands requesting such data, the response indicating that the memory access module 130 did not attempt to retrieve corresponding data from the memory device 110 and/or that corresponding data from the memory device 110 is not being provided in response to the memory request, and/or was not retrieved from memory device 110. In some implementations, the length of such responses is truncated to reduce time and/or bandwidth used to provide the responses to reduce the time to replenish buffer 150 and exit the second mode. In some implementations, such indications may be provided to the processing module 140 as a signal that as asserted while, and further indicating, that memory access module 130 is operating in the second mode.

Memory access module 130 further includes control logic 290 which is arranged to control and coordinate interactions between, and operation of, request receiver 210, received queue 220, memory command generator 230, memory interface 240, response data buffer 250, pending request tracking module 260, mode selector 270, and/or response transmitter 280.

FIG. 3 is a schematic diagram illustrating features included in an implementation of the system 100 illustrated in FIG. 1 in which a memory controller 330 controls accesses to the memory device 110 by multiple masters 310a-310n, including a first master 310a that includes the memory access module 130 illustrated in FIGS. 1 and 2. In some implementations, the first master 310a also includes processing module 140, buffer 150, buffer monitor 160, and/or real-time module 170. As illustrated in FIG. 3, the masters 310a-310n, interconnect 320, and memory controller 330 may be included in a system-on-a-chip (SoC) 300, with memory device 110 externally coupled to SoC 300. Examples of masters 310b-301n include, but are not limited to CPUs, graphics processing units (GPUs), network communication devices, storage controllers, and input/output (I/O) controllers. Masters 310a-310n are each communicatively coupled to memory controller 330 via interconnect 320 and arranged to share access to memory device 110 via memory controller 330, which is arranged to schedule and perform accesses to memory device 110. Examples of memory controllers are described in U.S. Patent Application Publication No. 2015/0293709, entitled "Fine-Grained Bandwidth Provisioning in a Memory Controller" and published on Oct. 15, 2015, which is incorporated by reference herein in its entirety. Much as discussed above, shared access to memory device 110 by multiple masters 310a-310n substantially increases variation and unpredictability in latency and throughput for memory access module 130 that can lead to underflow of buffer 150 and failures to meet real-time deadlines for providing data to real-time module 170. Although memory controller 330 may be configured to prioritize accesses by master 310a, that does not fully resolve latency and/or throughput issues for master 310a, and also tends to diminish the total bandwidth or throughput achieved by all masters 310a-310n. However, the techniques discussed in this disclosure are effective for responding to latency and/or throughput issues in shared memory systems, and reducing amounts of invalid data provided to real-time module 170 as a result of such issues.

FIG. 4 illustrates an example of interactions among, and operation of, the features illustrated in FIG. 1 in which the memory access module 130 remains in a first mode M1 and retrieves data from the memory device 110 for memory requests received from the processing module 140. At 405, the memory access module 130 is operating in the first mode M1, for example, as determined by mode selector 270. This may be referred to as a "default" or "normal" operating mode. While operating in the first mode M1, the memory access module 130 will continue to attempt to retrieve data from memory device 110 corresponding to memory requests received from the processing module 140 (as illustrated by operations 415-430) and further attempt to respond to such memory requests with data actually retrieved from the memory device 110 (as illustrated by operations 435-450). However, as will be illustrated in subsequent figures, the memory access module 130 may abandon such attempts if it, for example, switches to another operating mode (such as, for example, the second mode M2 illustrated in FIG. 5).

At 410, processing module 140 generates a memory read request (request A) to obtain data from memory device 110, and at 415 processing module 140 issues the generated memory read request to memory access module 130. For example, processing module 140 may identify a portion of data stored in memory device 110 that is to be used for generating output data for real-time module 170. Although FIG. 4 illustrates generating a single memory request at 410, multiple memory requests may be generated and issued to memory access module 130. For example, at 410, processing module 140 may identify all of the data portions needed to generate a group of output data for buffer 150 (for example, a scan line of pixel data for a display controller). Although it may not be illustrated or described in other portions of this disclosure, it may be presumed that each memory request issued by the processing module 140 to the memory access module 130 is accompanied by a preceding generation of the memory request, much as done here for request A.

Also at 415, memory access module 130 receives the memory read request (request A), such as via request receiver 210. At 420, memory access module 130 generates one or more memory read commands corresponding to the memory request received at 415, for example, by use of memory command generator 230. In this particular example, two memory read commands, a first memory read command (read A-1) and a second memory read command (read A-2), are generated for request A. Depending on the implementation and the state of memory requests previously received by memory access module 130, request A may be stored in received queue 220 before 420, and/or read A-1 and read A-2 may be stored in received queue 220 before 425.

At 425 and 430, memory access module 130 issues the memory read commands, read A-1 and read A-2, via interconnect 120 to retrieve corresponding data from memory device 110. For example, memory interface 240 may issue read A-1 and read A-2. Depending on the implementation and circumstances, memory access module 130 may prioritize memory requests and/or memory commands, such that before 425 or 430 memory access module 130 issues a memory command for a memory request received by memory access module 130 after 415. In the example illustrated in FIG. 4, read A-1 and read A-2 are concurrently outstanding (read A-2 is issued before read A-1 is completed), which may occur if interconnect 120 (such as via a memory controller) or memory device 110 are arranged to queue or otherwise receive a memory command from memory access module 130 before completing another memory command previously received from memory access module 130. Request A and/or read A-1 and read A-2 may be tracked by pending response tracking module 260 while read A-1 and/or read A-2 remain to be completed. Many of the above details for receiving a memory request and issuing one or more corresponding memory commands apply to other memory requests received by memory access module 130 in this disclosure.

At 435, memory access module 130 receives data A-1 retrieved from memory device 110 in response to the memory read command read A-1, and at 445, memory access module 130 receives data A-2 retrieved from memory device 110 in response to the memory read command read A-2. For example, data A-1 and data A-2 and/or respective signals that memory read commands read A-1 and read A-2 were completed may be received via memory interface 240. In some implementations, a memory controller (such as memory controller 330) may fulfill memory commands in a different order than they were received; for example, data A-2 may instead be received before data A-1. Also, where a memory controller (such as memory controller 330) coordinates accesses to memory device 110 for multiple masters (as illustrated in FIG. 3), accesses to memory device 110 for other masters can introduce a variable, and sometimes substantial, latency or delay between issuing a memory command (such as issuing read A-1 at 425 or read A-2 at 430) and the memory command being completed. At 440, data A-1 is buffered, such as in response data buffer 250. Although not illustrated in FIG. 4, data A-2 may likewise be buffered. Many of the above details for receiving data in response to one or more corresponding memory commands apply to other memory commands issued by memory access module 130 in this disclosure.

At 450, in response to completion of all of the memory commands generated for the memory request received at 415 (for request A, memory read commands read A-1 and read A-2), memory access module 130 responds to the memory read request received at 415, such as by sending a response, response A, to processing module 140 using response transmitter 280. This response indicates that the data stored in memory device 110 was retrieved from memory device 110, and makes the retrieved data (data A-1 and data A-2) available to processing module 140. As discussed in connection with FIG. 2, various mechanisms may be used to provide the retrieved data to processing module 140; for example, a shared memory. Many of the above details for responding to a memory request for which all corresponding data has been retrieved from memory device 110 apply to other such circumstances in this disclosure.

At 455, in response to receiving response A, the processing module 140 determines that it has received all of the one or more responses associated with data to be retrieved from memory device 110 for generating an output data, and accordingly processes the received responses to generate the output data. The output data is intended for real-time module 170, although additional outputs may also be generated for other purposes. For example, although only one memory request, request A, is illustrated in FIG. 4, one or more additional responses, also associated with data to be retrieved from memory device 110 for generating the output data generated at 455, may have been received before, or in addition to, the operations illustrated in FIG. 4. In the example illustrated in FIG. 4, the output data is generated based on a portion of the data provided by response A (data A-1 and data A-2). Many of the above details for receiving responses to memory requests issued in connection with an output data and generating the output data apply to other such circumstances in this disclosure.

At 460, buffer 150 receives the output data generated by processing module 140 at 455. At 465, the received data is stored in buffer 150. As discussed above, there are various techniques and implementations that may be used to store the output data and provide the stored output data to real-time module 170. As discussed above, in some implementations buffer 150 may be a FIFO for groups of output data, where buffer 150 receives a group of output data from processing module 140 via one or more transfers, and provides the group of output data to real-time module 170 via one or more transfers after any previously received groups of output data have been provided to real-time module 170. However, it is noted that buffer 150 is not limited to FIFO buffers. Many of the above details for storing output data generated by processing module 140 in buffer 150 apply to other such circumstances in this disclosure.

At 470, in response to receiving the output data at 460 or storing the received data at 465, buffer monitor 160 may increase an amount of available data. For example, in response to storing 4 bytes of output data in buffer 150, a value in a register or other memory may be increased by a corresponding amount (for example, by 4, although other units of measurement may be used). Where buffer 150 handles output data as groups, the amount of available data may not be increased until all of a group of output data has been received or stored. Although not illustrated in FIG. 4, an increase in the amount of available data may result in buffer monitor 160 generating an indication of a change in a status of buffer 150, as illustrated at 580 in FIG. 5 (an example in which an increased amount of available data becomes greater than or equal to a threshold T2). Many of the above details for buffer monitor 160 responding to buffer 150 receiving or storing output data apply to other such circumstances in this disclosure.

At 475, real-time module 170 obtains output data provided by buffer 150. For example, buffer 150 may provide or deliver output data to real-time module 170 in response to a message or other signal from real-time module 170 requesting or indicating readiness for output data, or in response to a clock signal, although other techniques may be used. Real-time module 170 may issue a message or other signal indicating real-time module 170 obtained output data from buffer 150. At 480, in response to real-time module 170 obtaining output data from buffer 150, buffer monitor 160 may decrease an amount of available data. For example, in response to real-time module 170 obtaining 4 bytes of output data from buffer 150, a value in a register or other memory may be decreased by a corresponding amount (for example, by 4, although other units of measurement may be used). Although not illustrated in FIG. 4, decrease in the amount of available data may result in buffer monitor 160 generating an indication of a change in the status of buffer 150, as illustrated at 515 in FIG. 5 (an example in which a decreased amount of available data becomes less than or equal to a threshold T1). Many of the above details for buffer monitor 160 responding to real-time module 170 obtaining output data from buffer 150 apply to other such circumstances in this disclosure.

FIG. 5 illustrates an example of interaction among, and operation of, the features illustrated in FIG. 1, in which the memory access module 130 temporarily operates in a second mode M2 in which it responds to one or more memory requests from the processing module 140 by indicating that the memory access module 130 did not attempt to retrieve corresponding data from the memory. Much as at 405 in FIG. 4, at 505, the memory access module 130 may be operating in the first mode M1, for example, as determined by mode selector 270. However, in some implementations, at 505 the mode may be something other than the first mode M1 or the second mode M2. Much as at 475 in FIG. 4, at 510, real-time module 170 obtains output data from buffer 150 and, much as discussed for 480 in FIG. 4, this results in an amount of available data in buffer 150 (for example, immediately before 510) being decreased from an initial amount to a decreased amount reflecting real-time module 170 obtaining output data from buffer 150 at 510.

At 515, buffer monitor 160 determines that the decreased amount of available data in buffer 150 is less than or equal to the first threshold T1, which corresponds to buffer 150 being in the underflow approaching state, as discussed above for buffer monitor 160 in FIG. 1. The first threshold T1 may be referred to as a "low watermark." It is noted that although the decreased amount is less than or equal to the first threshold T1, the initial amount was not; accordingly, the amount of available data in buffer 150 is less than or equal to the first threshold T1 as a result of real-time module 170 obtaining output data from buffer 150 at 510. At 520, in response to the determination at 515 that the amount of available data in buffer 150 is less than or equal to the first threshold T1, the buffer monitor 160 outputs an underflow approaching state indication to memory access module 130, indicating that buffer 150 is in the underflow approaching state. In some implementations, the underflow approaching state indication may continue to be output while the amount of available data remains less than or equal to the first threshold T1; for example, the underflow approaching state indication may simply be generated by a comparator circuit with the first threshold T1 and the amount of available data as its inputs. At 525, in response to receiving the underflow approaching state indication, memory access module 130 switches to the second mode M2; for example, this switch in the operating mode may be performed by mode selector 270. Many of the above details for determining buffer 150 has entered the underflow approaching state and memory access module 130 switching to the second mode in response to such a determination apply to other such circumstances in this disclosure.

In the example illustrated in FIG. 5, in response to operating in the second mode M2, memory access module 130 will respond to incoming memory read requests (memory read requests received after switching to the second mode M2) with an indication that the memory access module 130 did not attempt to retrieve corresponding data from the memory device 110 and/or that corresponding data from the memory device 110 is not being provided in response to the memory request, as illustrated at 530 (request B), 535 (response B), 540 (request C), 545 (response C), 560 (request D), 565 (response D). For example, memory access module 130 may be arranged to, in response to operating in the second mode M2, respond to each incoming memory read request with an indication that the memory access module 130 did not attempt to retrieve corresponding data from the memory device 110 and/or that corresponding data from the memory device 110 is not being provided in response to the memory request. At 530, processing module 140 issues a memory read request B to memory access module 130. At 535, rather than initiate retrieving corresponding data from memory device 110 (as done at 415-430 in FIG. 4, for example), memory access module 130 instead promptly responds to processing module 140 with an indication that the memory access module 130 did not attempt to retrieve corresponding data from the memory device 110 and/or that corresponding data from the memory device 110 is not being provided in response to the memory request.

At 540 and 545, a memory read request C and its respective response C are handled in essentially the same manner as at 530 and 535. At 550, in response to receiving response B at 535 and receiving response C at 545, and possibly in response to other responses to memory read requests issued by memory access module 130 before it switched to the second mode M2 at 525, the processing module 140 determines that it has received all of the one or more responses associated with data to be retrieved from memory device 110 for generating an output data. Although a similar determination was made in determining to generate output data 455 in FIG. 4, at 550 processing module 140 has received one or more responses (response B and response C, in this example) to memory read requests that did not provide data from main memory device 110 that ordinarily would have been used to generate the output data, leaving processing module 140 with having to generate some or all of the output data without at least a portion of the data from memory device 110. Since memory access module 130 responds very rapidly to memory read requests from processing module 140, processing module 140 is able to proceed to 550 very quickly. Portions of the output data for which all of the data from memory device 110 was retrieved may be referred to a "valid output data" or "undegraded output data." Portions of the output data for which a portion of the data from memory device 110 was not retrieved may be referred to as "invalid output data" or "degraded output data." Degraded output data may be "partially degraded" where one or more requests for data from the memory device 110 have been fulfilled, and the partially degraded output data, or a portion thereof, is generated using the data obtained via the fulfilled requests despite other data that would ordinarily also be used not being available. Depending on the operations processing module 140 uses to generate output data, whether and how much partial data was retrieved from memory device 110, as well as how the output data is used by the real-time module 170, degraded output data may have a respective degree of noticeability. At 555, buffer 150 receives the output data generated by processing module 140 at 550, including degraded output data, stores the received output data, and increases the amount of available data in buffer 150, as described for 460, 465, and 470 in FIG. 4.

In some implementations in which processing module 140 generates output data in the form of pixel data, a fixed color value may be used for degraded output data. For example, by making degraded output pixel data red, this may provide a visual indication for a developer to highlight image portions associated with issues in achieving desired pixel data generation throughput.

In some implementations, responses such as response B, indicating that the memory access module 130 did not attempt to retrieve corresponding data from the memory device 110 and/or that corresponding data from memory device 110 is not being provided in response to the memory read request, are provided to processing module 140 in a different form than responses to memory read requests while operating in the first mode M1. For example, a length of a response to a memory read request in the second mode M2 may be shorter (for example, a smaller number of bytes) than a length of a response to a memory read request while operating in the first mode M1, and as a result reduce a time to transfer the response to processing module 140. As another example, in a handshaking procedure used to deliver a memory read request from processing module 140 to memory access module 130, memory access module 130 indicates that corresponding data from memory device 110 is not being provided in response to the memory request, possibly reducing time for the handshaking (if terminated early) and eliminating a separate response phase. By providing these responses in a form allowing them to be delivered more quickly, processing module 140 generates output data more quickly, and as a result more quickly brings buffer 150 out of the underflow approaching state.

In some implementations, in response to receiving an indication that the memory access module 130 did not attempt to retrieve corresponding data from the memory device 110 and/or that corresponding data from memory device 110 is not being provided in response to a memory read request, processing module 140 will skip any remaining unissued memory read requests for generating an output data. In such an implementation, rather than issue request C at 540, processing module 140 would proceed from 535 (response B indicating that the memory access module 130 did not attempt to retrieve corresponding data from the memory device 110 and/or that corresponding data from memory device 110 is not being provided in response to request B) to the generation of output data at 550. This allows processing module 140 to more directly and quickly proceed to generating output data, and as a result more quickly brings buffer 150 out of the underflow approaching state.

While operating in the second mode M2, memory access module 130 continues to respond to incoming memory read requests with an indication that the memory access module 130 did not attempt to retrieve corresponding data from the memory device 110 and/or that corresponding data from memory device 110 is not being provided in response to the memory read request, and based on such indications processing module 140 generates output data, including degraded output data, which is stored in buffer 150, and the amount of available data is increased, repeating operations similar to operations 530, 535, 540, 545, 550, and 555 in FIG. 5. Since memory access module 130 responds very rapidly to memory read requests from processing module 140, and avoids attempts to retrieve data from memory device 110, processing module 140 provides output data to buffer 150 far more quickly than when memory access module 130 operates in the first mode M1 (in which data from memory device 110 is provided in response to each memory read request). In some implementations, mode selector 270 is configured to switch out of the second mode M2 (for example, back to the mode it was using before switching to the second mode M2 at 525) after a predetermined or configurable amount of time. In some implementations, mode selector 270 is configured to switch out of the second mode M2 after receiving a predetermined or configurable number of memory read requests from processing module 140. In some implementations, mode selector 270 is configured to switch out of the second mode M2 after a predetermined or configurable amount of output data has been generated by processing module 140.

Operations 560, 565, 570, 575, 580, 585, and 590 illustrate an approach to switching out of the second operating mode M2 based on determining that buffer 150 has received enough output data from processing module 140 to reach a threshold amount of available data in buffer 150. In general, this approach is more effective in avoiding reentering the underflow approaching state than the implementations described in the previous paragraph, as it accounts for how quickly processing module 140 has actually generated output data and for how quickly real-time module 170 has consumed output data. In 560, 565, 570, and 575, output data is generated and stored in buffer 150 much as described for 530, 535, 540, 545, 550, and 555. However, at 580, buffer monitor 160 determines that the amount of available data in buffer 150 is greater than or equal to a second threshold T2. The second threshold T2 may be referred to as a "high watermark." It is noted that at 570, the amount of available data in buffer 150 was not greater than or equal to a second threshold T2; although the decreased amount is less than or equal to the first threshold T1, the initial amount was not; accordingly, the amount of available data in buffer 150 is greater than or equal to the second threshold T2 as a result of output data receiving output data from processing module 140 at 575. The second threshold T2 is set to a value greater than or equal the first threshold value T1. Accordingly, the buffer 150 exits the underflow approaching state by the time 580 occurs (although it may have exited underflow approaching state earlier, if the second threshold T2 is greater than the first threshold T1).

At 585, in response to the determination at 580 that the amount of available data in buffer 150 is greater than or equal to the second threshold T2, the buffer monitor 160 outputs an exit underflow approaching state indication (or "exit underflow approaching indication") to memory access module 130, indicating that buffer 150 is no longer in the underflow approaching state. In some implementations, this indication may be provided by no longer generating the underflow approaching state indication described for 520, above. At 590, in response to receiving the exit underflow approaching state indication, memory access module 130 switches out of the second mode M2; for example, this switch in the operating mode may be performed by mode selector 270. Although FIG. 5 illustrates switching the mode to the first mode M1, memory access module 130 may instead switch back to the mode it was using before switching to the second mode M2 at 525.

Although the second threshold T2 can have a value equal to, or approximately equal to, the first threshold T1, a more robust approach is for the second threshold T2 to have a value substantially greater than the first threshold T1. This approach avoids having the memory access module 130 switch out of the second mode M2 when the amount of available data in buffer 150 around a sensitive "tipping point" that could easily and more quickly return buffer 150 to the underflow approaching state, and possibly cause the memory access module 130 to "ping pong" in and out of the second mode M2, resulting in further degraded output data while in the second mode M2. In an implementation in which buffer 150 provides groups of output data to real-time module 170, the second threshold T2 may be set to a value of T1+group_size, T1+2×group_size, or T1+N×group_size (with "group_size" being approximately equal to an average size of a group of output data).

Use of a non-zero value for first threshold T1 and the corresponding identification of the underflow approaching state enables memory access module 130 to take more effective action than would be achieved by waiting for and allowing actual underflow of buffer 150 (where buffer 150 cannot provide stored output data needed to need a real-time deadline for real-time module 170). In general, at 515 (the first threshold T1), conditions have reached a point, whether due to latency in retrieving data from memory device 110, throughput from memory device 110, or other causes, where it has become unlikely that the processing module 140 will generate the next output data quickly enough, including getting additional memory requests completed to retrieve data from memory device 110 to generate that next output data, to avoid an actual underflow of buffer 150. Thus, pursuing those additional memory requests will likely worsen the short-term situation and, in some or most cases, wastes bandwidth for memory device 110 (since data is being retrieved for generating output data that will not be used by real-time module 170). Also, when actual underflow of buffer 150 occurs (as is done in conventional approaches to dealing with underflow), processing module 140 has been allowed to wastefully retrieve data from memory device 110 for generating useless output data. By not pursuing those additional memory requests, bandwidth can be put to other, more effective, uses for memory access device 130 or other components of system 100. By not waiting for those additional memory requests, and generating output data with whatever data processing module 140 already has obtained from memory device 110 (if any), processing module 140 can more quickly generate output data (even if degraded) and advance its workpoint to where it can retrieve actual data from memory device 110 to generate undegraded output data. Responding to the underflow approaching state of buffer 150 at the memory access module 130 by avoiding retrieving data from memory device 110, as discussed above, is a particularly targeted and effective approach.

Another advantage to the approach illustrated in FIG. 5 is that, assuming that processing module 140 quickly generates output data while the memory access module 130 is operating in the second mode M2, and as a result ensures there is always enough available data in buffer 150 to eliminate actual underflows of buffer 150. As a result, buffer 150 and/or real-time module 170 no longer require logic and/or circuitry for "underflow errors."

Another advantage to the approach illustrated in FIG. 5 is that processing module 140 may make still make use of data already retrieved from memory device 110, and that data may be used by processing module 140 to possibly generate undegraded portions of output data, and generate portions of degraded output data that are only partially degraded. Also, even in an event that no data has been retrieved from memory device 110 to generate a portion of output data, resources included in processing module 140 may enabled more sophisticated approaches to generating degraded output data that is less noticeable and/or more aesthetically pleasing than may be pursued elsewhere in the pipeline.

Figure 6:
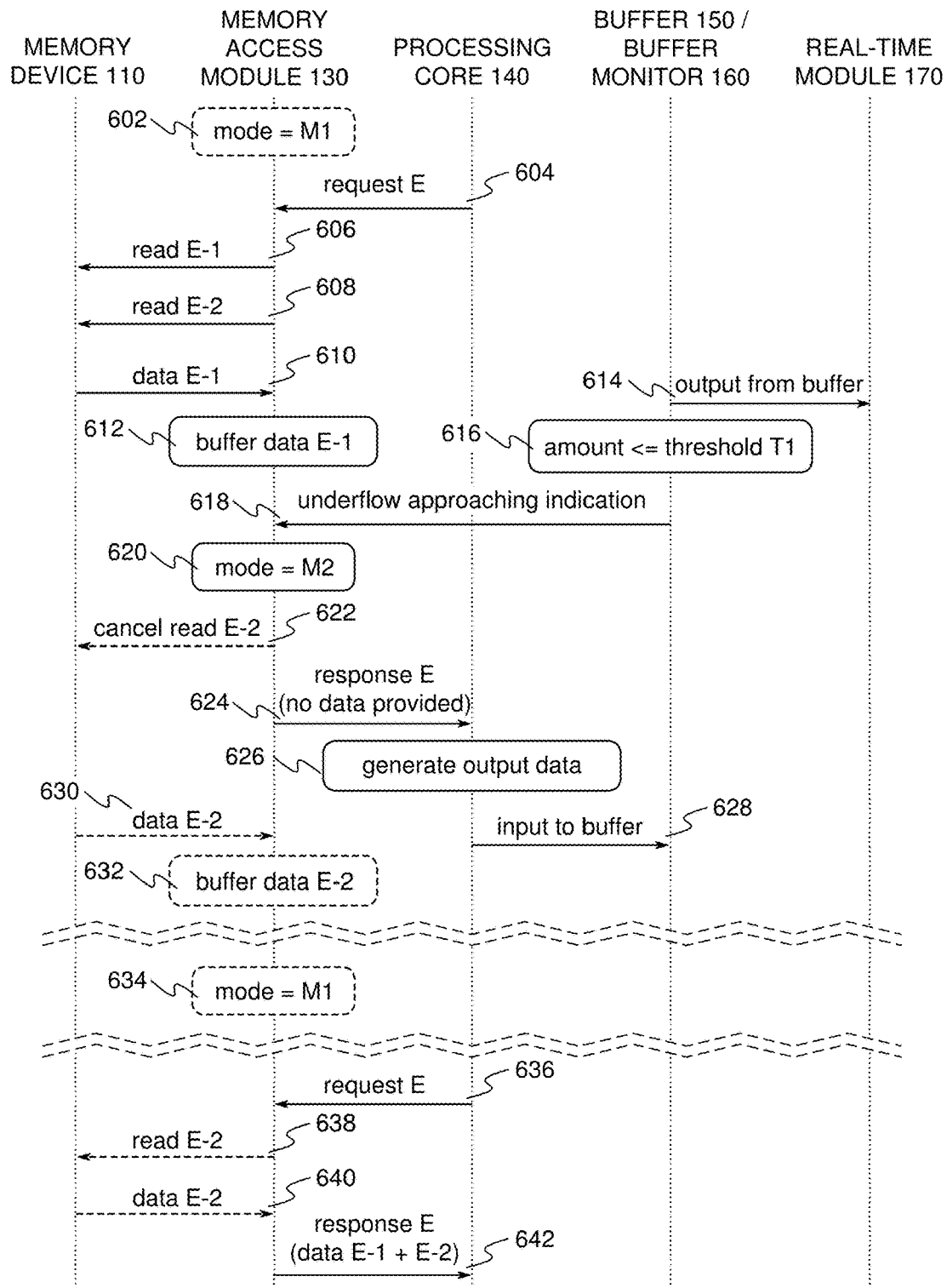
FIG. 6 illustrates an example of interaction among, and operation of, the features illustrated in FIG. 1, in which the memory access module switching to the second mode interrupts a pending retrieval of data from the memory device.

FIG. 6 illustrates an example of interaction among, and operation of, the features illustrated in FIG. 1, in which the memory access module 130 switching to the second mode M2 interrupts a pending retrieval of data from the memory device 110. This offers a further improvement on the approach illustrated in FIG. 5, which does not specifically address memory read requests that have been received from processing module 140, but have not been completed. Operations 602, 604, 606, 608, 610, and 612, for a memory read request E, are performed in essentially the same way as operations 410, 415, 420, 425, 430, 435, and 440 for memory read request A. Operations 614-620, in which memory access module 130 switches to the second mode M2, are performed in essentially the same way as operations 510, 515, 520, and 525 in FIG. 5. However, at 620, the memory read command issued at 608, read E-2, remains pending or otherwise uncompleted (for example, but not necessarily, due to memory device 110 being shared with other components of system 100 and/or scheduling by a memory controller). In some implementations, at 622, in response to switching to the second mode M2, memory access module 130 may issue a command requesting that the memory read command read E-2 be cancelled and/or aborted, to avoid using memory device 110 bandwidth to transfer data E-2.

At 624, whether or not read E-2 is cancelled and/or aborted at 622, in response to switching to the second mode M2, memory access module 130 promptly responds to processing module 140 with an indication that the memory access module 130 did not attempt to retrieve corresponding data from the memory device 110 and/or that corresponding data from memory device 110 is not being provided in response to the memory read request E, much like the indication at 535 for response B in FIG. 5. For example, where read E-2 is not cancelled and/or aborted at 622, response E is sent without waiting for pending read E-2 to complete. By not waiting for a pending memory read command to complete, processing module 140 proceeds more quickly to generating output data at 626 in response to receiving response E and providing the generated output data to buffer 150 at 628, which are performed much as described for operations 550 and 555 in FIG. 5. As a result, memory access module 130 more quickly switches out of the second mode M2 (for example, at 634 in FIG. 6) and processing module 140 more quickly returns to retrieving data from memory device 110 and generating undegraded output data.

In some implementations, data E-2 received by memory access module 130 at 630 may simply be discarded. In some other implementation, data E-2 received by memory access module 130 at 630 may be buffered along with data E-1 received at 612, despite having sent response E at 624. For example, data E-1 and data E-2 may be stored in response data buffer 250 until replaced and/or removed to store data received at a later time. This allows, while data E-1 and data E-2 remain buffered by memory access module 130, for another request for the same data from memory device 110 to be fulfilled without issuing additional memory read commands for data E-1 and/or data E-2, even while memory access module 130 is operating in the second mode M2 (although, as illustrated at 634, memory access module 130 may switch out of the second mode M2 before receiving request E at 636). A similar approach may be used for data E-1 buffered at 612. For example, if read E-2 is successfully cancelled and/or aborted at 622, data E-1 may remain in response data buffer 250 until replaced and/or removed to store data received at a later time. If, at 636, memory access module 130 has switched out of the second mode M2 at 634 and data E-1 is still buffered at 636, data E-1 may be included with response E without again issuing memory read command E-1; if data E-2 is buffered at 636, data E-2 may likewise be included with response E without again issuing memory read command E-2 (otherwise, read E-2 may be issued again at 638, and data E-2 received at 640 to be included along with data E-1 in response E at 642).

Although memory access module 130 may not switch out of the second mode M2 between 624 and 636, in some implementations processing module 140 is configured to, although having received the indication that the memory access module 130 did not attempt to retrieve corresponding data from the memory device 110 and/or that corresponding data from memory device 110 is not being provided in response to the memory read request E at 624 in connection with retrieving data from memory device 110 for the output data generated at 626, again issue request E if it is associated with generating another output data. As a result, if memory access module 130 is operating in the second mode M2 and both data E-1 and E-2 are buffered, at 642 response E includes corresponding data E-1 and data E-2, possibly avoiding or reducing degradation of one or more output data portions.

Figure 7:
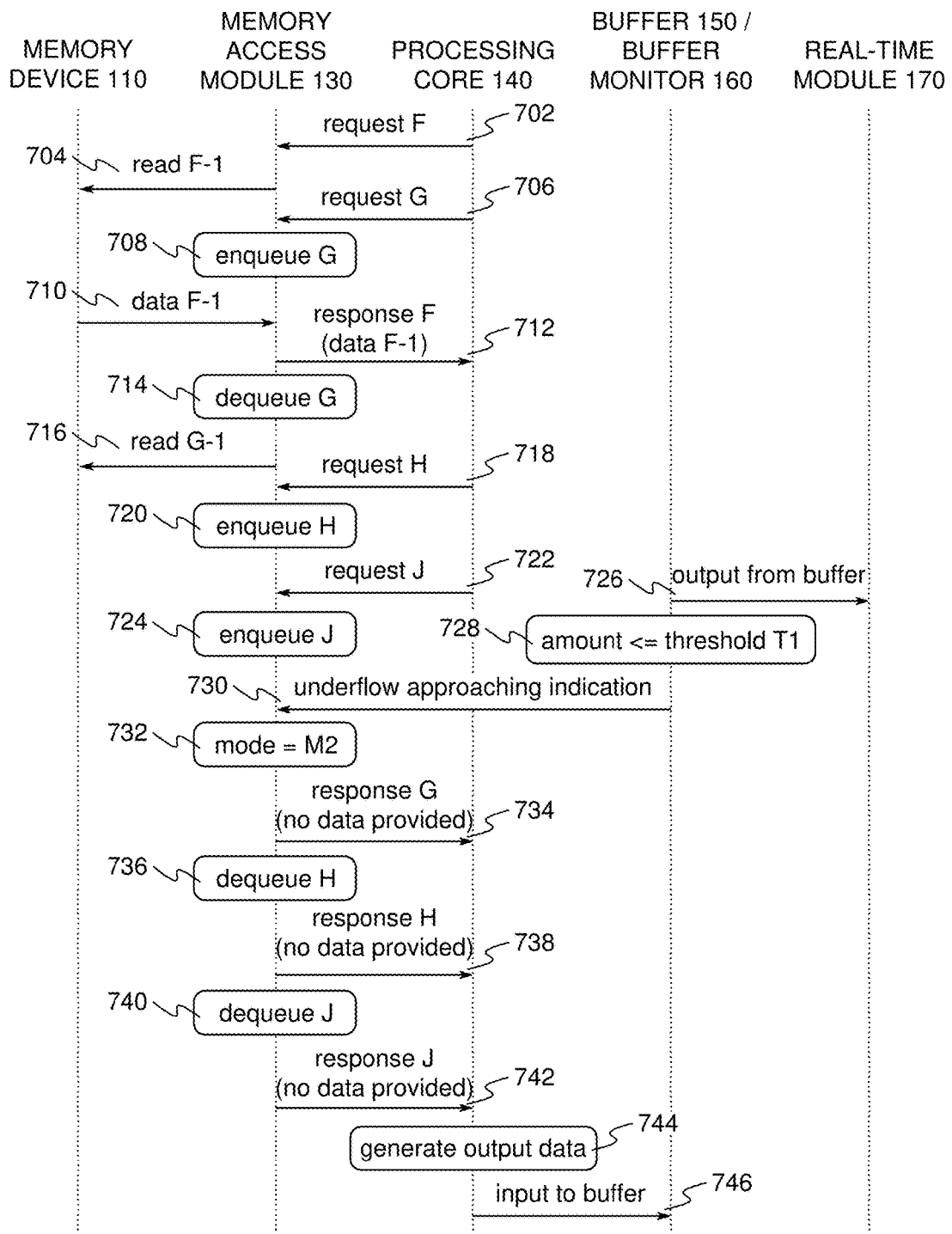
FIG. 7 illustrates an example of interaction among, and operation of, the features illustrated in FIG. 1, in which the memory access module queues memory requests and in which a switch to the second mode results in responding to queued memory requests by indicating that the memory access module did not attempt to retrieve corresponding data from the memory.

FIG. 7 illustrates an example of interaction among, and operation of, the features illustrated in FIG. 1, in which the memory access module 130 queues memory requests and in which a switch to the second mode M2 results in responding to queued memory requests by indicating that the memory access module did not attempt to retrieve corresponding data from the memory. This offers a further improvement on the approaches illustrated in FIGS. 5 and 6, which do not specifically address memory read requests that have been received from processing module 140, but for which no memory read commands have been issued by memory access module 130. At 702, memory access module 130 is not operating in the second mode M2; for example, it may be operating in the first mode M1. Operations 702, 704, 710, and 712, for a memory read request F, are performed in essentially the same way as operations 410, 415, 420, 425, 445, and 450 for memory read request A (although there is only one memory read command F-1 generated for memory read request F).

At 706, memory access module 130 receives memory read request G while request F is pending. For purposes of simplifying the discussion of the techniques illustrated in FIG. 7, in the example of FIG. 7 only one pending memory read command is permitted; however, the techniques illustrated in FIG. 7 can likewise be applied where, as illustrated in the examples of FIGS. 4-6, there may be more than one memory command pending at a time. With read F-1 having issued at 704 but not completed at 706, memory read command G-1 for cannot be issued at 706. As a result, memory access module 130 enqueues request G and/or read G-1, for example, as described in connection with received queue 220 above. At 714, in response to read F-1 completing at 710, request G and/or read G-1 are dequeued and, at 716, memory access module 130 issues read G-1. Much as described above for receiving request G at 706 and enqueuing request G and/or read G-1 at 708, memory read request H and memory read request J are received and enqueued at 718, 720, 722, and 724. As a result, at 732 (discussed below), request H and request J will remain enqueued.

Operations 726, 728, 730, and 732, in which memory access module 130 switches to the second mode M2, are performed in essentially the same way as operations 510, 515, 520, and 525 in FIG. 5 or operations 614, 616, 618, and 620 in FIG. 6. At 732, request H and request J are still enqueued, and read G-1 remains not completed. Much as described in connection with issuing response E at 624 in FIG. 6, at 734, in response to switching to the second mode M2 at 732, memory access module 130 promptly responds to processing module 140 with an indication that the memory access module 130 did not attempt to retrieve corresponding data from the memory device 110 for the memory read request G and/or that corresponding data from memory device 110 is not being provided in response to the memory read request G, without waiting for read G-1 to complete. Much as described for operation 622, read G-1 may be cancelled and/or aborted in some implementations. Much as described for operations 630, 632, 636, and 642, if memory access module 130 receives data G-1 while operating in the second mode M2, data G-1 may be buffered. It is noted that although FIG. 7 illustrates responding to response G without waiting for read G-1 to complete at 734, this approach for issued but uncompleted memory read requests does not have to be combined with the approach for responding to queued requests illustrated at 736, 738, 740, and 742.

At 736, in response to switching to the second mode M2 at 732, memory access module 130 dequeues request H. At 738, without initiating retrieving corresponding data for request H from memory device 110, memory access module 130 promptly responds to processing module 140 with an indication that the memory access module 130 did not attempt to retrieve corresponding data from the memory device 110 for the request H and/or that corresponding data from memory device 110 is not being provided in response to the request H, much as done at 535 in FIG. 5 for request B. At 740 and 742, request J is dequeued and a response is sent for request J in much the same manner as request H. At 736 and 740, requests H and J, as queued requests, are identified as not having had corresponding memory read commands issued to memory device 110, such as via the memory controller 330 illustrated in FIG. 3. The operations of 736, 738, 740, and 742, in which responses are issued to queued requests in response to switching to the second mode M2 without initiating retrieving corresponding data from memory device 110, allows processing module 140 to proceed more quickly to generating output data at 744 in response to receiving responses H and J and to providing the generated output data to buffer 150 at 746, which are performed much as described for operations 550 and 555 in FIG. 5 or 626 and 628 in FIG. 6. As a result, memory access module 130 more quickly switches out of the second mode M2 and processing module 140 more quickly returns to retrieving data from memory device 110 and generating undegraded output data. In some implementations, at 744 partially degraded output data may be generated, including an undegraded or partially degraded portion of the output data generated using the data F-1 provided at 712 in response to the request F issued at 702.

Operating memory access module 130 in the second mode M2 to avoid fulfilling memory read requests, as illustrated in FIGS. 5, 6, and/or 7, is significantly more effective than conventional underflow management approaches where real-time module 170 is a display controller configured to provide pixel data to a display using reduced horizontal and/or vertical blanking periods or lacking horizontal and/or vertical blanking periods. With older display technologies and standards (such as VESA (Video Electronics Standards Association) Coordinated Video Timings (CVT)) designed to accommodate repositioning an electron beam in a cathode ray tube (CRT) display, a horizontal blanking period at the end of each scan line could offer a brief opportunity for conventional techniques to recover from underflow (and accordingly, an uncertain opportunity), and a longer vertical blanking period at the end of each frame generally allowed enough time to recover from most underflow events (although where recovery did not occur in a horizontal blanking period, a frame would be corrupted from the beginning of the underflow to the end of the frame). However, more recent display timing standards, such as, but not limited to, the CVT-RB and CVT-RB2 modes in VESA-2013-3 v1.2, significantly reduce these blanking intervals; and nonstandard display pipelines may even further reduce, or even eliminate, such blanking intervals. As a result, conventional underflow management approaches lose most or all of the blanking intervals they depend on for underflow recovery, whereas the approaches illustrated in FIGS. 5, 6, and/or 7 remain robust and effective, and do not rely on blanking periods for efficiently managing underflow.

Additionally, operating memory access module 130 in the second mode M2 to avoid fulfilling memory read requests, as illustrated in FIGS. 5, 6, and/or 7, is significantly more effective than conventional underflow management approaches where real-time module 170 is a display controller configured to provide pixel data to a display operating at a high frame rate and/or high resolution. The increased throughput demanded by such display controllers increases the likelihood and the degree of underflow experienced with conventional underflow management approaches, whereas the approaches illustrated in FIGS. 5, 6, and/or 7 remain robust and effective in high throughput applications.

Figure 8:
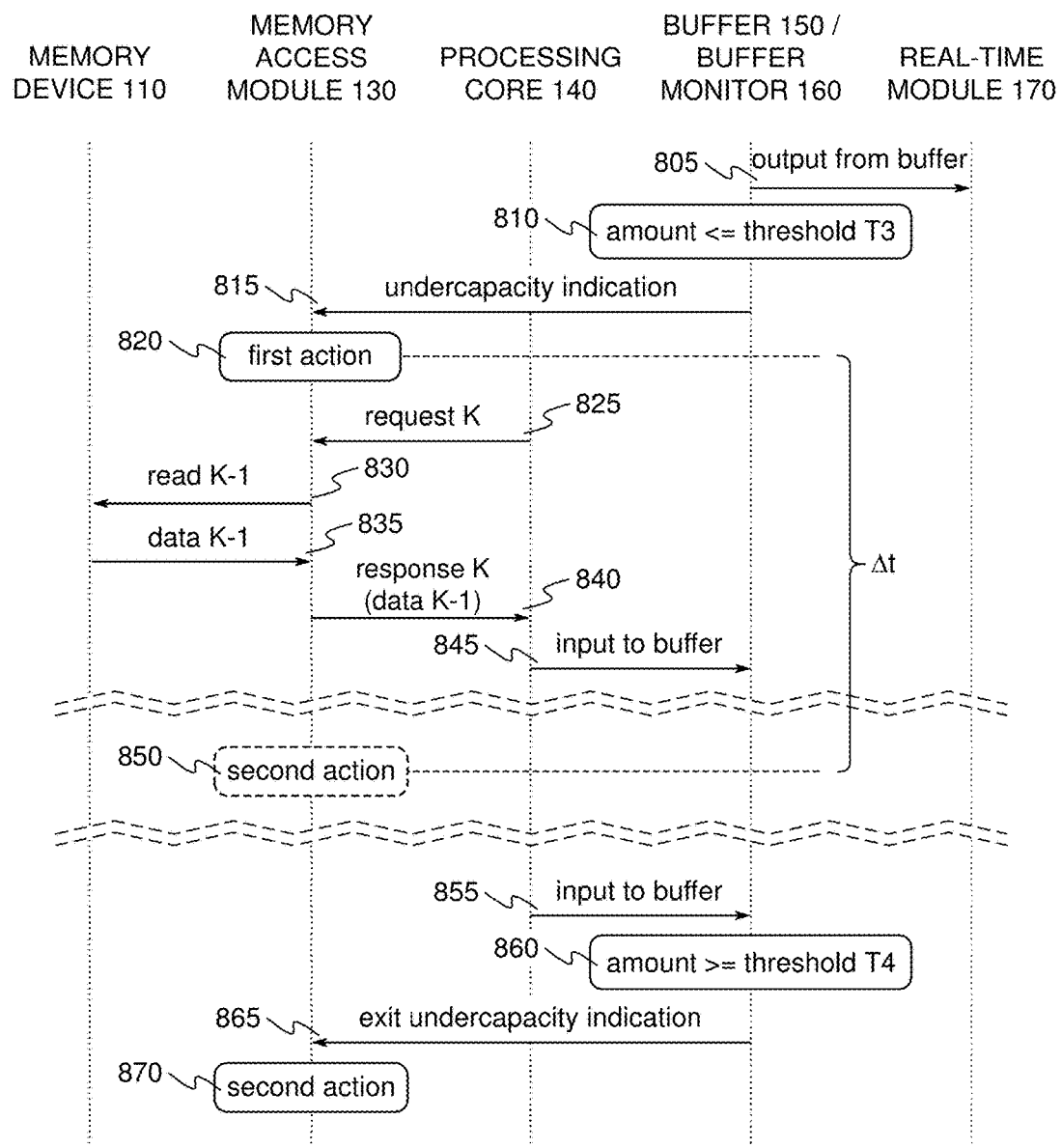
FIG. 8 illustrates an example of interaction among, and operation of, the features illustrated in FIG. 1, in which the buffer monitor applies one or more additional threshold levels and the system takes corresponding actions.

FIG. 8 illustrates an example of interaction among, and operation of, the features illustrated in FIG. 1, in which the buffer monitor 160 applies one or more additional threshold levels and the system 100 takes corresponding actions. Much as at 510 in FIG. 5, at 810, real-time module 170 obtains output data from buffer 150 and, much as discussed for 510 in FIG. 5, this results in an amount of available data in buffer 150 (for example, immediately before 810) being decreased from an initial amount to a decreased amount reflecting real-time module 170 obtaining output data from buffer 150 at 810.

At 810, buffer monitor 160 determines that the decreased amount of available data in buffer 150 is less than or equal to a third threshold T3, which corresponds to buffer 150 being in an undercapacity state or condition. It is noted that although the decreased amount is less than or equal to the third threshold T3, the initial amount was not; accordingly, the amount of available data in buffer 150 is less than or equal to the third threshold T3 as a result of real-time module 170 obtaining output data from buffer 150 at 805. At 815, in response to the determination at 810 that the amount of available data in buffer 150 is less than or equal to the third threshold T3, the buffer monitor 160 outputs an undercapacity indication to memory access module 130, indicating that buffer 150 is in the undercapacity state. In some implementations, the undercapacity indication may continue to be output while the amount of available data remains less than or equal to the third threshold T3; for example, the undercapacity indication may simply be generated by a comparator circuit with the third threshold T3 and the amount of available data as its inputs.

At 820, in response to receiving the undercapacity indication, memory access module 130 performs or initiates a first action directed to increasing the amount of available data in buffer 150 without generating degraded output data (whereas when memory requests are not fulfilled while memory access module 130 is operated in the second mode M2, usually at least a portion of the resulting output data is degraded). Although FIG. 8 illustrates the undercapacity indication being delivered to memory access module 130, in some implementations another component of system 100 may receive or initiate the first action. Examples for the first action include, but are not limited to, increasing a bandwidth allocation for memory access module 130 at a memory controller (to increase throughput from memory device 110), increasing a queue depth at a memory controller for memory commands from memory access module 130 (to improve throughput from memory device 110), increasing a clock rate for memory device 110 (to increase total system memory bandwidth or throughput), increasing a clock rate for processing module 140 (to reduce time to generate output data once data has been retrieved from memory device 110), have processing module 140 switch to a different process for generating output data that uses less memory throughput (although possibly yielding lower quality output data), use a different memory device with less contention and/or higher throughput for a portion of the data being retrieved via memory device 110 (for example, having a component, such as a GPU or digital signal processor (DSP), that generates data sought by processing module 140 store the data in a memory included in the component, and having memory access module 130 retrieve the data directly from that component; this may also free bandwidth on memory device 110 that would have been used to write the data into memory device 110 and read the data out of memory device 110), and/or reduce a rate of output data required by real-time module 170 (for example, redisplaying a portion of a display image from a previous frame instead of generating new output data for that portion, or reducing a frame rate of a display device). If the first action is effective, the amount of available data will increase over time. Operations 825, 830, 835, 840, and 845 illustrate that after the first action is performed and/or initiated, memory read requests, such as request K, continue to be fulfilled and output data generated using the retrieved data.

The third threshold T3 is set to a value substantially greater than the first threshold value T1. This allows some time for the first action to demonstrate a positive effect before buffer 150 reaches the underflow approaching state. In an implementation in which buffer 150 provides groups of output data to real-time module 170, the third threshold T3 may be set to a value of T1+group_size, T1+2×group_size, or T1+N×group_size (with "group_size" being approximately equal to an average size of a group of output data).

In some implementations, at 850, after a passage of a predetermined amount of time (Δt) after performing and/or initiating the first action at 820, a second action is performed and/or initiated that reverses the first action. In some implementations, at 855 and 860, the amount of available data in buffer 150 becomes greater or equal to a fourth threshold T4.

At 865, in response to the determination at 860 that the amount of available data in buffer 150 is greater or equal to a fourth threshold T4, buffer monitor 160 outputs an exit undercapacity indication. At 870, in response to receiving the exit undercapacity indication, the second action described above is performed and/or initiated. Use of the second action, either at 850 or 870, ensures that the first action is only effective temporarily, which may be desirable where the first action uses hardware resources that may be useful for other components, increases power consumption, and/or reduces output quality.

Figure 9:
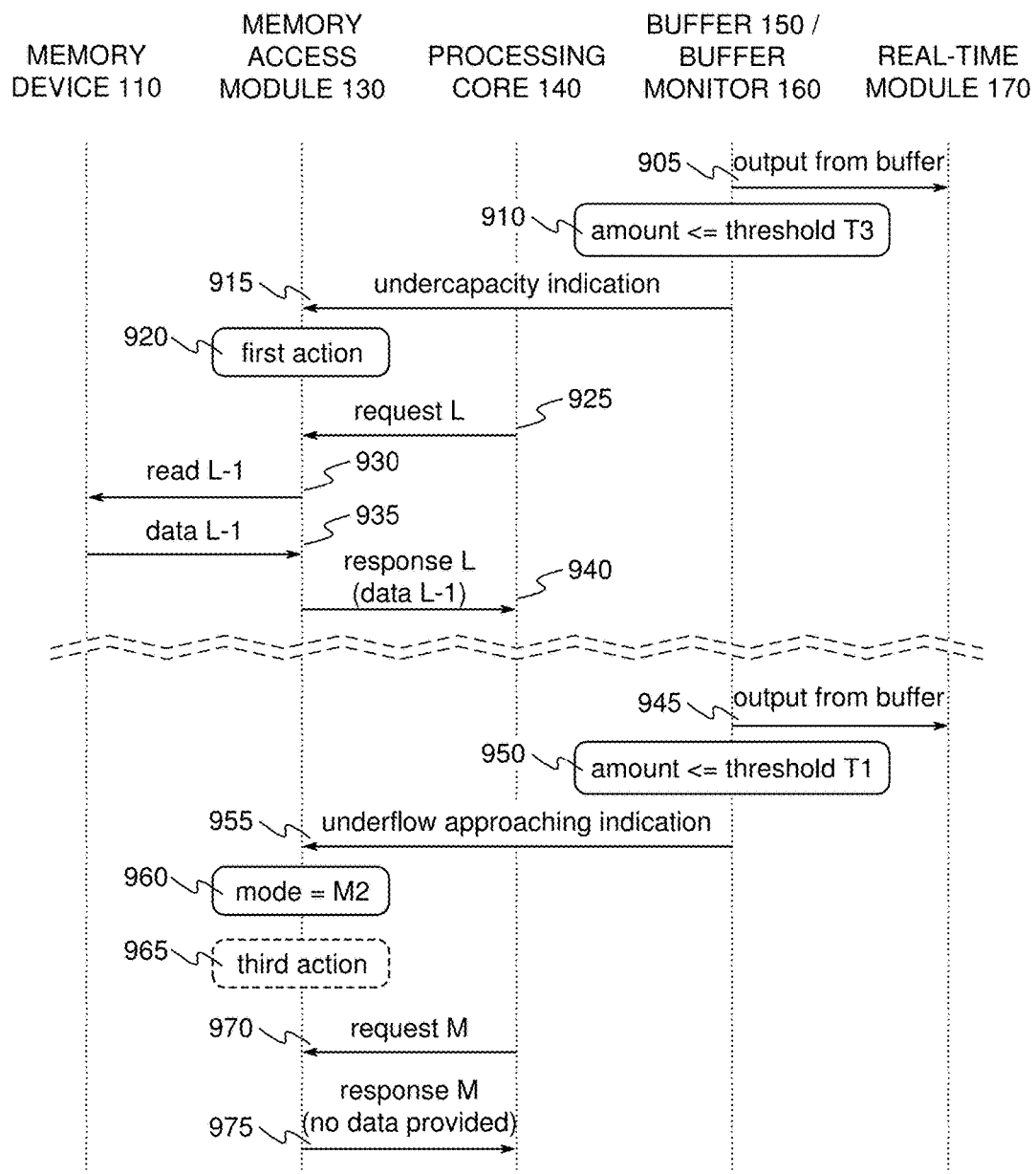
FIG. 9 illustrates an example of interaction among, and operation of, the features illustrated in FIG. 1, in which, despite performing and/or initiating the first action as illustrated in FIG. 8, the buffer still reaches an underflow approaching state.

FIG. 9 illustrates an example of interaction among, and operation of, the features illustrated in FIG. 1, in which, despite performing and/or initiating the first action as illustrated in FIG. 8, the buffer 150 still reaches an underflow approaching state. Operations 905, 910, 915, 920, 930, 935, and 940 are identical to their counterparts 805, 810, 815, 820, 825, 830, 835, and 840 in FIG. 8. Although use of the first action may be appealing since memory requests issued by processing module 140 continue to be fulfilled, the first action may not prevent the amount of available data in buffer 150 from declining further. Operations 945, 950, 955, and 960, in which memory access module 130 switches to the second mode M2, are performed in essentially the same way as operations 510, 515, 520, and 525 in FIG. 5. At 950, the first action has continued to be in effect since 920, but the amount of available data in buffer 150 has continued to decline, with buffer 150 reaching an underflow approaching state. By switching into the second mode M2, the more certain approaches to avoiding underflow of buffer 150 illustrated in FIG. 5 (as illustrated at 970 and 975), 6, and/or 7 are used. In some implementations, at 965, in response to switching to the second mode M2 with the first action from 920 is in effect, a third action may be performed and/or initiated. For example, like the second action at 850 or 870 in FIG. 8, the third action may reverse the first action. Alternatively, or in addition, the third action may perform and/or initiate a different one of the examples of first actions described above for FIG. 8.

FIG. 10 is a schematic diagram illustrating features included in an example system 1000 arranged to control access to a memory to reduce negative effects of insufficient data throughput for real-time late stage reprojection (LSR) of an initial rendered image for display via a display controller 1050. LSR is particularly useful for immersive and/or interactive display technologies. For example, with a virtual reality (VR), augmented reality (AR), or mixed reality (MR) system using a head-mounted display device (HMD) worn by an end user, most end users are sensitive to, and some users are hypersensitive to, even low amounts of latency between user movements (for example, head movements) and resulting images. Additionally, in an AR or MR system using an optical see-through display (including, but not limited to, an optical see-through HMD worn by an end user) that allows direct viewing of a real-world environment (for example, via transparent lenses or a transparent panel) and projects images of a virtual object into the visual field of the end user thereby augmenting the real-world environment perceived by the end user with the virtual object, LSR improves an end user experience by reducing latency, and associated misregistration between a virtual object and the real-world environment, in response to the end user's movements and interactions with the AR or MR system. In addition to systems using HMDs, there are other immersive display techniques and applications (for example, a video game console that generates and displays images based on predicted poses for an end user based on sensors not located on an end user's body). LSR also provides an approach to generating images with low latency with respect to input on mobile devices and/or in low power applications, as it allows a complex three-dimensional scene to be rendered at a low frame rate and one or more reprojections of the rendering based on more recently predicted poses without full rerendering. Examples of LSR are described in U.S. Pat. No. 9,514,571, entitled "Late Stage Reprojection" and issued on Dec. 6, 2016, which is incorporated by reference herein in its entirety.

Except where conflicting with the below discussion, the descriptions in FIGS. 1-9 of interconnect 320, memory controller 330, memory device 110, memory access module 130, processing module 140, buffer 150, buffer monitor 160, and real-time module 170 apply to their counterparts interconnect 1005, memory controller 1060, memory device 1065, memory access module 1030, late stage reprojection (LSR) processing module 1035, buffer 1040, buffer monitor 1045, and display controller 1050 illustrated in FIG. 10. CPU 1025 is configured to coordinate and control operation of the other components included in system 1000. In some implementations, pose estimation module 1015 and image rendering module 1020 may be implemented in part by CPU 1025. System 1000 includes one or more machine readable media including instructions and/or data therein which, when processed and/or executed by elements of system 1000, cause those elements and/or system 1000 to perform the various techniques described herein; for example, CPU 1025 may execute according to instructions stored in a nonvolatile storage device. In some implementations, image rendering module 1020 may be implemented in part by a GPU (not illustrated in FIG. 10). In some implementations, the elements illustrated in FIG. 10, except for display 1055 and memory 1065, may be included in a single SoC, much as illustrated in FIG. 3. In some implementations, the elements illustrated in FIG. 10, with or without display 1055, may be included in a single electronic or mobile device. In some implementations, the elements illustrated in FIG. 10 may be included in a single head-mounted mobile device. In some implementations, display 1055 is optical see-through display. Further details of system 1000 are described below in connection with FIGS. 11-15.

Figure 11:
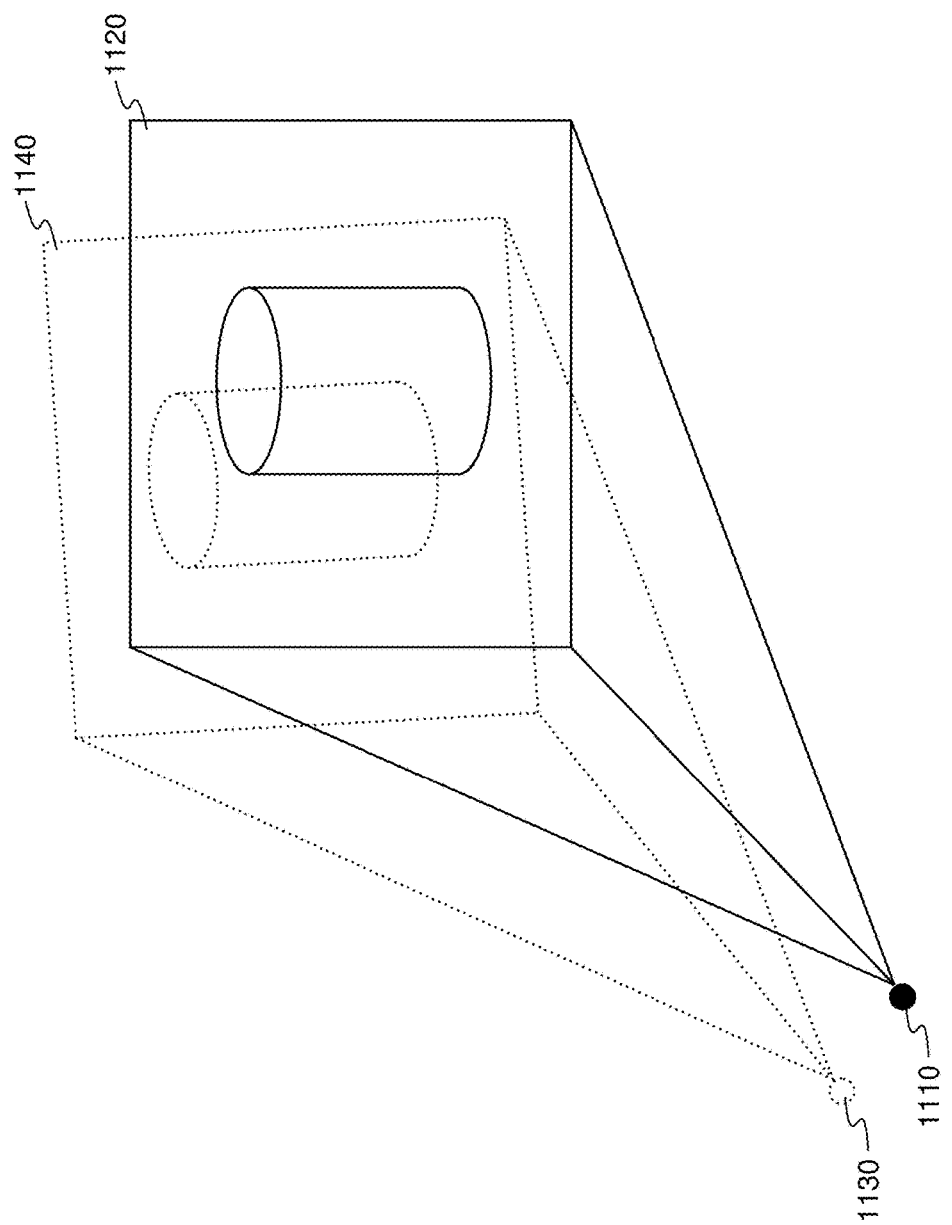
FIG. 11 illustrates an example of an initial rendered image and use of LSR to generate an updated image based on the initial rendered image and corresponding to an updated predicted pose.

FIG. 11 illustrates an example of an initial rendered image 1120 and use of LSR to generate an updated image 1140 based on the initial rendered image 1120 and corresponding to an updated predicted pose 1130. In the example illustrated in FIG. 11, the system 1000 obtains an initial predicted pose 1110 for an end user. Sensors 1010 are arranged to collect and provide sensor data such as, but not limited to orientation data, movement data, position data, image data, environment depth data, audio data, and/or eye-tracking data. For an HMD-based implementation, most or all of the sensors 1010 (or at least sensors 1010 providing data for pose estimation) may be included in or on the HMD. Pose estimation module 1015 is arranged to, based on sensor data collected over time, generate a predicted pose for a selected time in the near future for an end user of system 1000 based on sensor data collected by sensors 1010. A predicted pose may indicate, for example, a position, an orientation (for example, a gaze direction), and movement information (for example, movement information effective for applying motion blur).

An initial predicted pose 1110 is generated by pose estimation module 1015 for a first selected time. Based on the initial predicted pose 1110 and information about a scene and/or objects to be displayed, image rendering module 1020 generates an initial rendered image 1120 for the initial predicted pose 1110. The first selected time may correspond to an estimated time that the initial rendered image 1120, or an updated image generated by LSR or the initial rendered image 1120, is displayed on display 1050. Image data for the initial rendered image 1120 may include, for example, pixel data for a two-dimensional image depicting a three-dimensional scene and/or object, a Z-buffer, geometry information, and/or texture information, and rendered image 1120 is stored in memory device 1065. Usually, a field of view for the initial rendered image 1120 is larger than a field of view for display 1050, and a portion or portions of the initial rendered image 1120 are used to generate updated images via LSR. The initial rendered image 1120 is stored in memory device 1065.

Typically, after initial rendered image 1120 has been generated based on the initial predicted pose 1110 (which may take a significant amount of time), sensors 1010 have collected additional sensor data that is used to generate an updated predicted pose 1130 for a second selected time. The second selected time may be approximately the first selected time (thereby providing a refined predicted pose based on more recent sensor data), or another time around the first selected time. LSR processing module 1035 is arranged to generate an updated image 1140 based on the updated predicted pose 1130 and the initial rendered image 1120 stored in the memory device 1065 by generating a series of output pixel data for updated image 1140 that is stored in buffer 1040, obtained by display controller 1050 under real-time constraints and deadlines, resulting in the updated image 1140 being presented to the end user on the display 1055 coupled to display controller 1050. Updated image 1140 may be generated based on a difference between the initial predicted pose and the updated predicted pose. The second time for the updated predicted pose 1130 corresponds to a time that updated image 1140 is presented on display 1055. To generate the output pixel data for updated image 1140, LSR processing module 1035 applies a transformation (such as, but not limited to, a homographic transformation, an affine transformation, a perspective transformation, and or a polynomial or bilinear transformation or interpolation, and combinations or sequences thereof) to a portion of the initial rendered image 1120 by retrieving subportions of the portion of the initial rendered image 1120 from the memory device 1065 for generating each unit of output pixel data. To avoid or eliminate underflow of the buffer 1040 and reduce amounts of degraded output data generated by LSR processing module 1035, the techniques described above for FIGS. 1-9 are also applied to system 1000. The various elements of those techniques obtain similar or the same effects in system 1000 as described for FIGS. 1-9, for similar or the same reasons. Plus, application of those techniques in system 1000 realizes additional effects that are more specific to the arrangement and uses of system 1000.

Buffer 1040 does not store all of updated image 1140 at one time; instead, using a more limited amount of storage in buffer 1040, LSR processing module 1035 generates new output pixel data for buffer 1040 while display controller 1050 obtains previously generated output pixel data from buffer 1040. Benefits of this arrangement include a reduction in hardware resources and/or reduced power consumption. However, it does also present an opportunity for display controller 1050 to experience underflow of buffer 1040; for example, and much as previously described, accesses to memory device 1065 by multiple masters in system 1000 can result in memory read requests by LSR processing module 1035 not being fulfilled in time to generate output pixel data to meet a real-time deadline for display controller 1050. For the various reasons previously described, whether expressly or implicitly described, various elements of the techniques described above for FIGS. 1-9 offer superior solutions to underflow-related concerns over those previously offered.

Also, these techniques are well suited for displaying a series of images as video, and offer improvements over conventional approaches. Many conventional approaches to managing underflow attempt to avoid degraded output altogether by demanding increased bandwidth (for example, by increasing a QoS priority) to obtain all of the requests data from memory. However, such approaches can result in a memory controller making tradeoffs that negatively affect over components of a system; for example, overcommitment of bandwidth for one master can reduce total system bandwidth or throughput or amounts of bandwidth or throughput remaining for other masters, or overprioritization of a first master can result in a memory accesses issued by the first master at a time that the first master is not very sensitive to increased latency or reduced throughout displacing a memory access for a second master that is more time critical. For the various reasons previously described, whether expressly or implicitly described, various elements of the techniques described above for FIGS. 1-9 will instead allow degraded output data to be generated (as a result of not fulfilling memory read requests in the second mode M2, as illustrated in FIGS. 4-7), but in a controlled manner that reduces the amount and/or degree of degradation in degraded output data. As the degraded output data is only displayed for a frame period, and is limited in amount and/or visual effect, these techniques offer an improved balance between end user experience and performance.

Figure 12:
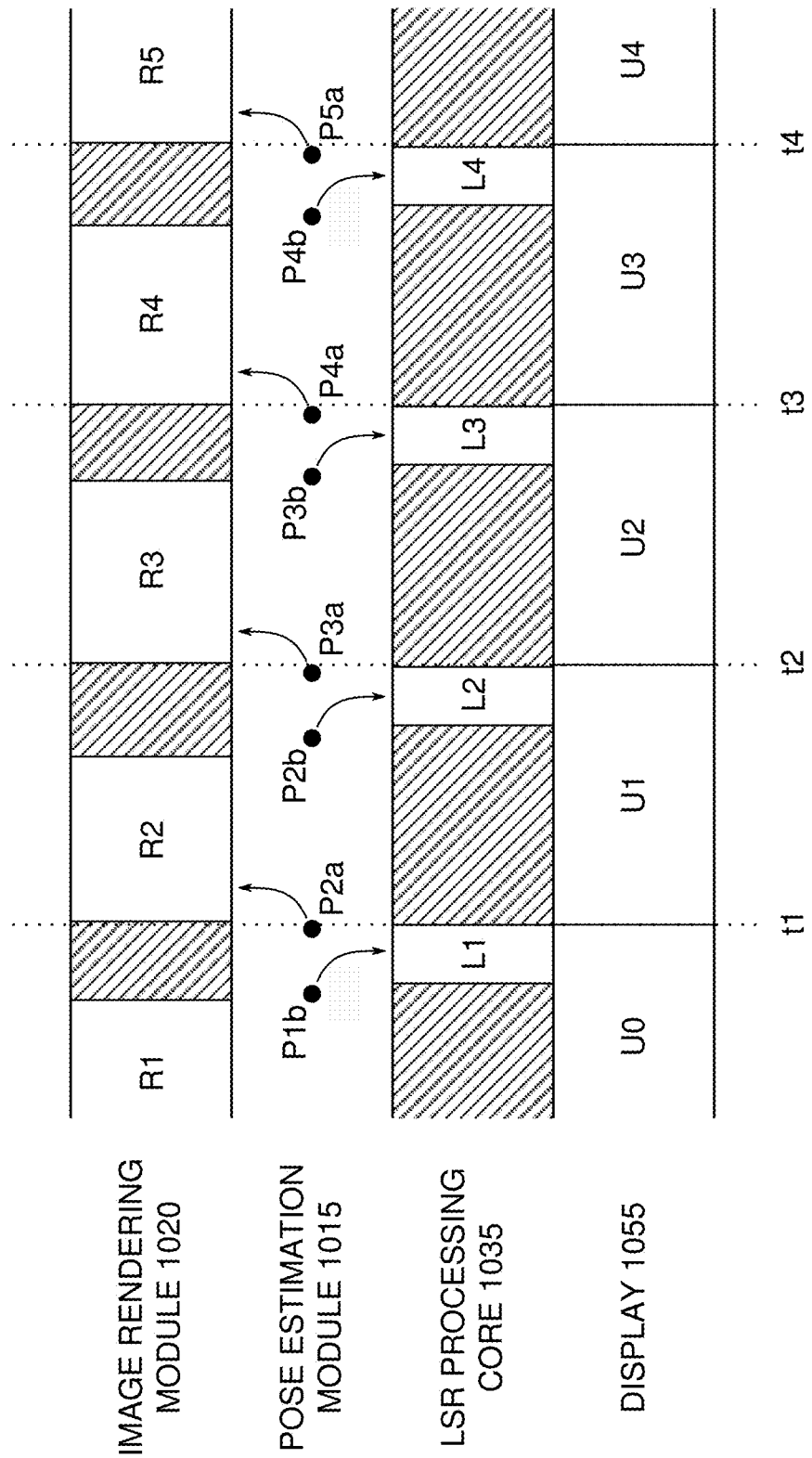
FIG. 12 illustrates a sequence of operations for generating initial rendered images and performing LSR of the initial images to display updated images corresponding to updated predicted poses.

FIG. 12 illustrates a sequence of operations for generating initial rendered images and performing LSR of the initial images to display updated images corresponding to updated predicted poses. In the example illustrated in FIG. 12, a single updated image is displayed for each initial image. For image rendering module 1020, each of R1, R2, R3, R4, and R5 illustrate periods of time that image rendering module 1020 is busy generating respective initial images. For example, for an updated image U2 that will be displayed from time t2 to time t3, at the beginning of generating initial image R2, pose estimate module generates and provides an initial predicted pose P2a for a time that updated image U2 will be displayed to an end user on display 1055 (for example, a time between t2 and t3). Image rendering module 1020 generates initial image R2 based on the initial predicted pose P2a. Then, shortly before time t2, pose estimation module 1015 generates an updated predicted pose P2b, also for a time that updated image D2 will be displayed to the end user on display 1055 (for example, the same time for initial predicted pose P2a). Although predicted poses P2a and P2b are both generated in connection with displaying updated image D2, the updated predicted pose P2b accounts for actual, rather than predicted, movements of the end user reflected in sensor data collected by sensors 1010 in the time between the generation of initial predicted pose P2a and updated predicted pose P2b. Further, use of LSR to generate the updated image U2 improves the end user experience for viewing an image that was initially rendered based on sensor data from nearly a full frame period before it is displayed. At L2, LSR processing module 1035 generates the updated image U2, delivering output pixel data for updated image U2 to display controller 1050 via buffer 1040 under real-time constraints and deadlines. Similar operations are performed in connection with updated images D1, D3, and D4.

Figure 13:
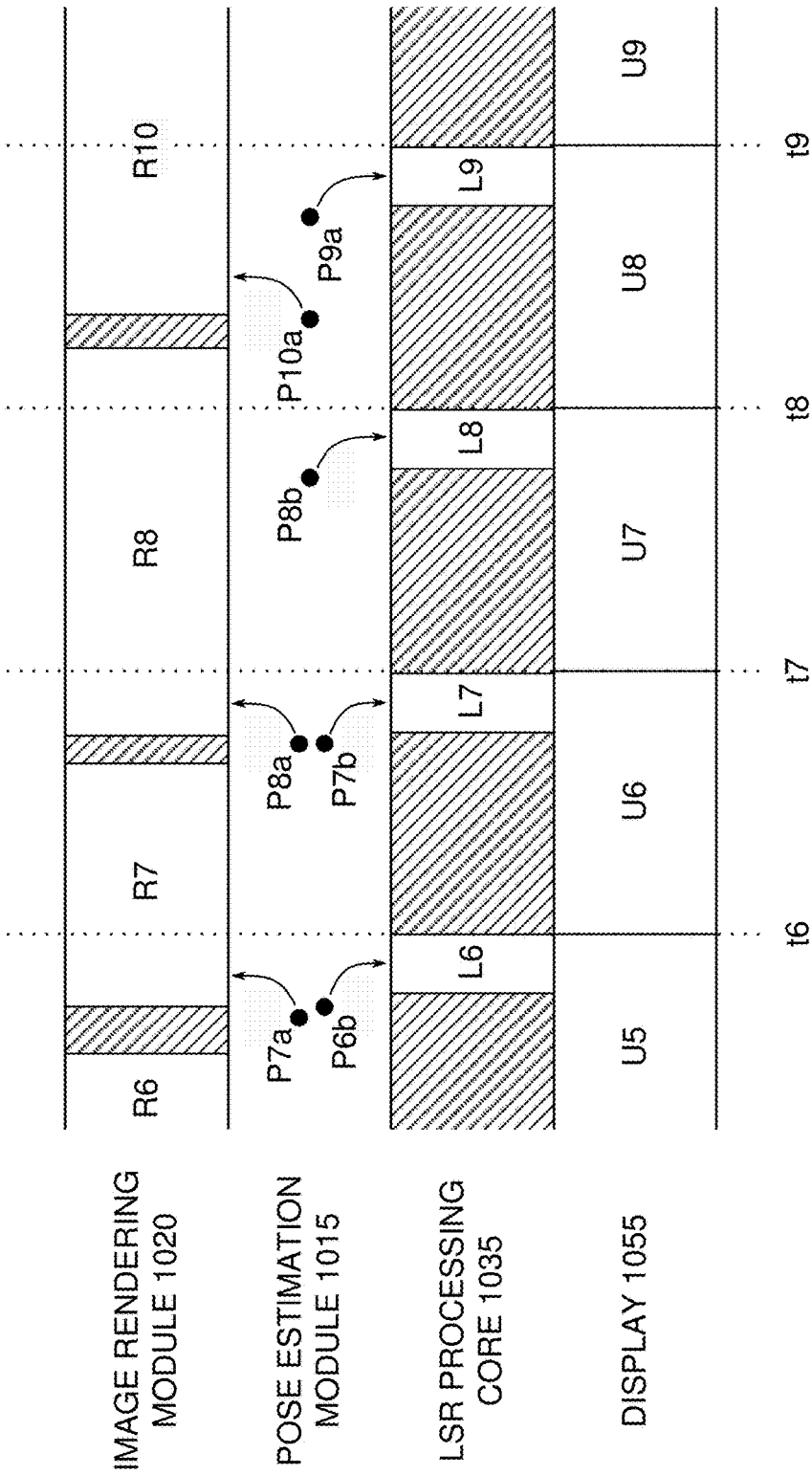
FIG. 13 illustrates another sequence of operations for generating initial rendered images and performing LSR of the initial images to display updated images corresponding to updated predicted poses.

FIG. 13 illustrates another sequence of operations for generating initial rendered images and performing LSR of the initial images to display updated images corresponding to updated predicted poses. In the example illustrated in FIG. 13, a more asynchronous approach is used to generate initial images, reducing amounts of time that image rendering module is not generating a new initial image. This approach may be preferred where a high frame rate is used, making it difficult to generate an initial image and provide the generated image, or an updated image based on the initial image, within a frame period. This approach may also be preferred during periods that high rendering quality is desired, or higher rendering complexity is involved.

In most respects, the operations of FIG. 13 are like the operations of FIG. 12. Before rendering an initial image, an estimate is made as to when one or more corresponding updates images will be displayed. For example, for rendering initial image R7, an initial predicted pose P7a is generated for a time that updated image U7 will be displayed, and at L7 the initial image R7 is used, based on updated predicted pose P7b for a time that updated image U7 will be displayed. However, sometimes the estimate is incorrect. For example, based on an estimate that initial image R8 would be displayed beginning at time T8, initial image R8 is generated based on an initial predicted pose P8a for a time that updated image U8 will be displayed (between times t8 and t9). However, it takes longer than expected to generate initial image R8. As a result, at L8, must again use initial image R7, but instead using updated predicted pose P8b (roughly two full frame periods after initial pose P7a was generated, and for a time a full frame period after the time for initial pose P7a used to render the initial image R7). Additionally, the first updated image D9 for initial image R8 is also displayed a full frame period after the time used for the initial pose P8a to render the initial image R8).

Figure 14:
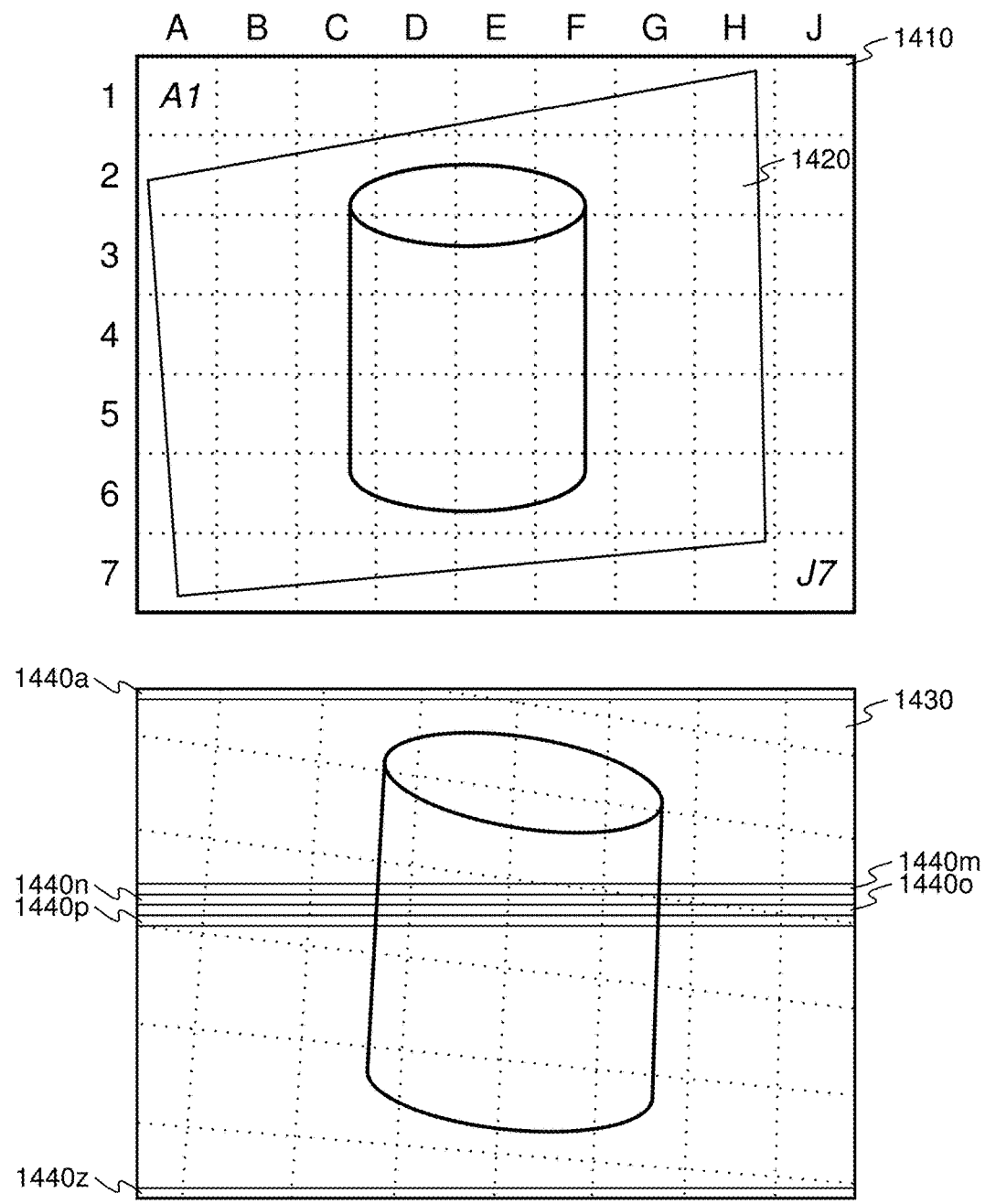
FIG. 14 illustrates an example of the LSR processing module illustrated in FIG. 10 generating an updated image based on an initial image and corresponding to an updated estimated pose.

FIG. 14 illustrates an example of the LSR processing module 1035 illustrated in FIG. 10 generating an updated image based on an initial image and corresponding to an updated estimated pose. In this example, an initial rendered image 1410 has been generated by image rendering module 1020 based on an initial predicted pose, and is stored in memory device 1065. In the example illustrated in FIG. 14, LSR processing module 1035 requests portions of the initial image 1410 from memory device 1065 as tiles; for example, initial image 1410 may be divided into tiles of 16×16 pixels, 16×32 pixels, 32×32 pixels, or some other rectangular arrangement of pixels. In the example illustrated in FIG. 14, tiles for the initial image 1410 are arranged in columns A, B, C, D, E, F, H, and J, and in columns 1-7; as shown in FIG. 14, the tile in the upper left hand corner is designated tile A1, and the tile in the lower right hand corner is designated tile J7. In response to receiving a memory read request from LSR processing module 1035, memory access module 1030 generates multiple memory read commands to retrieve the corresponding data from memory device 1065. In other examples, LSR processing module 1035 may identify and retrieve portions of an initial image in units other than tiles.

In the example illustrated in FIG. 14, LSR processing module 1035 generates output pixel data in successive horizontal scanlines. For generating output data for updated image 1430, LSR processing module 1035 begins with the horizontal scanline 1440a at the top of updated image 1430, working downward (through horizontal scanlines 1440m, 1440n, 1140o, and 1440p in sequence), and completing the updated image with horizontal scanline 1440z. Accordingly, buffer 1040 receives output pixel data from LSR processing module 1035 in these horizontal successive scanlines from the top of the updated image to the bottom. Also, display controller 1050 obtains the output pixel data from buffer 1040 in these horizontal successive scanlines from the top of the updated image to the bottom. However, this is not meant to imply that LSR processing module 1035 generates an entire scanline in a single operation, or that LSR processing module 1035 or display controller 1050 perform only a single transfer for an entire scanline. With reference to the "groups of output data" discussed in connection with buffer 150 above, in some implementations each horizontal scanline may be a "group of output data." However, such groups of output data are not required; for example, buffer 1040 may operate essentially as a byte or word stream, with display controller 1050 receiving bytes or words of output pixel data from buffer 1040 in the same order they were received from LSR processing module 1035. Other approaches may be used for LSR processing module 1035, buffer 1040, and display controller 1050 to cooperate in transferring groups of output pixel data to display controller 1050. For example, using vertical scanlines, partial scanlines, groups of scanlines, tiles or blocks, groups of tiles or blocks, rows or tiles or blocks, or columns of tiles or blocks.

Based on an updated predicted pose, system 1000 determines that updated image 1430 will be generated from image portion 1420 of the initial image 1410; for example, by performing a perspective transformation of image portion 1420. For a simple perspective transformation with little filtering of neighboring pixels, for LSR processing module 1035 to generate output pixel data for the horizontal scanline 1440a, LSR processing module 1035 must issue memory read requests for tiles E3, F3, G3, H3, A4, B4, C4, D4, E4, and F4 to memory access module 1030.

In implementations of systems 100 or 1000, such as the example illustrated in FIG. 14, where a processing module issues memory read requests that individually correspond to significant amounts of data to be retrieved from a memory device, various elements of the techniques described above for FIGS. 1-7 related to not fulfilling memory read requests in the second mode M2, and avoiding and/or abandoning, at least when a buffer is in an underflow approaching state, retrieving data for generating output data that will not, or likely will not be, generated as undegraded output data within an associated real-time deadline. When a buffer, such as buffer 150 or buffer 1040, has reached an underflow approaching state, pursuing a memory read request corresponding to significant amounts of data (for example, one of the tiles for initial image 1410), will generally worsen memory throughput issues that have led to the underflow approaching state, and delay recovery or increase the risk of quickly reentering the underflow approaching state after recovery. Also, the benefit of fulfilling such a memory read request may far outweigh the cost in throughput and delay. For example, although data for tile F4 is used to generate output pixel data for horizontal scanline 1440m, a very small fraction of the data for tile F4 is actually involved (as a result, a significant amount of throughput is involved to obtain a small amount of useful data), and that small fraction of data is used only for a small portion of the output data to be generated (so not fulfilling a memory request for tile F4 will result in little additional degradation in output data).

Figure 15A:
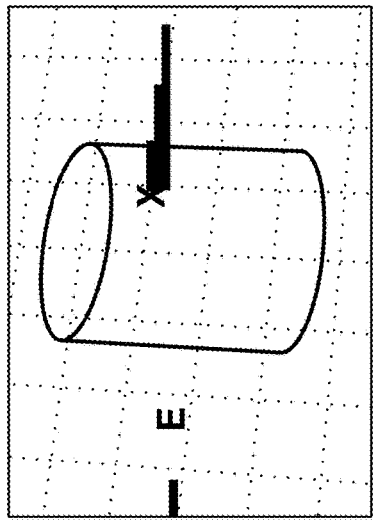
FIG. 15A illustrates a state of an example LSR.
Figure 15B:
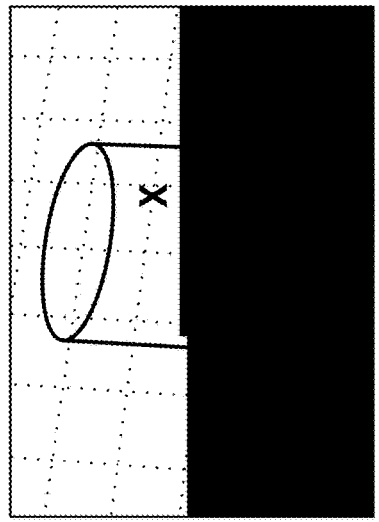
FIG. 15B illustrates an example result of the LSR illustrated in FIG. 15A obtained by applying the techniques illustrated in FIGS. 1-14.
Figure 15C:
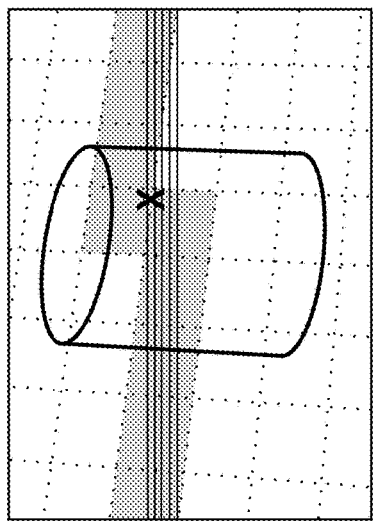
FIGS. 15C and 15D illustrates various example results of the LSR illustrated in FIG. 15A obtained by applying conventional underflow management techniques.
Figure 15D:
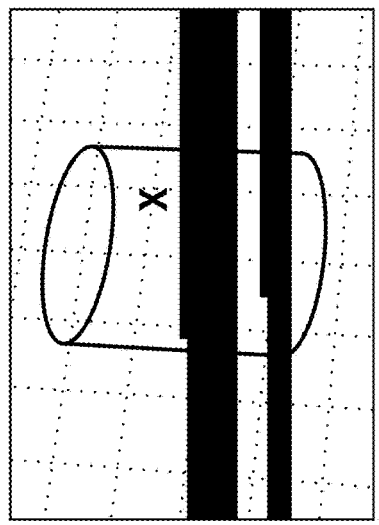

FIG. 15A illustrates a state of an example LSR. FIG. 15B illustrates an example result of the LSR illustrated in FIG. 15A obtained by applying the techniques illustrated in FIGS. 1-14. FIGS. 15C and 15D illustrates various example results of the LSR illustrated in FIG. 15A obtained by applying conventional underflow management techniques.

FIG. 15A illustrates an example in which, at the point labeled 'X' in LSR processing module 1035 attempting to generate output pixel data for horizontal scanline 1440m, buffer 1040 reaches an amount of available data that results in memory access module 1030 switching to the second mode M2 (in which memory access module 1030 avoids attempting to fulfill memory read requests from LSR processing module 1035). At the time shown in FIG. 15A, LSR processing module 1035 has already successfully retrieved data for the shaded tiles from memory device 1065.

FIG. 15B illustrates an example of the resulting output data for updated image 1430. The point labeled 'E' represents a point at which memory access module 1030 resumed fulfilling memory read requests from LSR processing module 1035. In FIG. 15B, the black rectangles represent degraded output data. The result shown in FIG. 15B, in contrast to the results in FIGS. 15C and 15D, demonstrates improved output quality obtained, for the various reasons previously described, whether expressly or implicitly described, by various elements of the techniques described above for FIGS. 1-9 that allow LSR processing module 1035 to continue to be used to generate output data while actively recovering from bandwidth or throughput issues and, in connection with this, make use of already retrieved data to generate output data at such times. As a result, only a small portion of the output data generated between points 'X' and 'E' were degraded. Additionally, with the already retrieved data, a degree of degradation for some of the degraded output data may be reduced (for example, interpolation of available data and/or interpolation of undegraded output data).

In FIG. 15C the conventional underflow management techniques wait until an actual underflow of buffer 1040 occurs (which is why degraded output data does not begin until a few scanlines after the point 'X'). Although this delays the beginning of degraded output data, allowing actual underflow results in retrieving data that is not received in time to generate output data by its real-time deadline. Also, although a recovery is made from underflow, another actual underflow occurs again, with additional degraded output data. In FIG. 15D, recovery from the underflow illustrated in FIG. 15C does not manage to occur. This may occur, for example, where horizontal blanking periods are unavailable or too short to catch up. As a result, after reaching underflow, the rest of the frame is degraded.

Generally, functions described herein (for example, the features illustrated in FIGS. 1-3 and 10) can be implemented using software, firmware, hardware (for example, fixed logic, finite state machines, and/or other circuits), or a combination of these implementations. The modules shown separately in FIGS. 1-3 and 10 may or may not be implemented as separate modules. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

One such configuration of a machine-readable medium is signal bearing medium and thus is configured to transmit the instructions (e.g. as a carrier wave) to a device, such as via a network. The machine-readable medium may also be configured as a machine-readable storage medium and thus is not a signal bearing medium, and may be a non-transitory machine-readable storage medium. Examples of a machine-readable storage medium include a random-access memory (RAM), read-only memory (ROM), an optical disc, flash memory, hard disk memory, and other memory devices that may us magnetic, optical, and other techniques to store instructions and other data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic device comprising:
    a buffer arranged to receive and store output pixel data;
    a buffer monitoring circuit configured to determine that the buffer is in an underflow approaching state based at least on an amount of available data in the buffer being less than or equal to a first threshold;
    a display controller configured to receive the stored output pixel data from the buffer for presentation via a display device coupled to the display controller; and
    one or more first modules configured to:
        identify a first portion of image data for an initial image stored in a memory device for use in generating first output pixel data for a first updated image;
        in response to operating in a first operating mode:
            issue one or more first memory read commands via an interconnect to retrieve the first portion of the image data from the memory device;
            receive the first portion of the image data via the interconnect in response to the first memory read commands;
            process the received first portion of the image data to generate the first output pixel data; and
            provide the first output pixel data to the buffer;
        identify a second portion of the image data stored in the memory device for use in generating second output pixel data for the first updated image;
        switch to a second operating mode based at least on the determination that the buffer is in the underflow approaching state; and
        in response to operating in the second operating mode:
            generate the second output pixel data without issuing a memory read command via the interconnect to retrieve the second portion of the initial image while operating in the second operating mode; and
            provide the second output pixel data to the buffer.

2. The electronic device according to claim 1, wherein:
    the buffer monitoring circuit is further configured to determine the buffer has exited the underflow approaching state based at least on an amount of available data in the buffer being greater than or equal to a second threshold; and
    the one or more first modules are further configured to exit the second operating mode based at least on the determination that the buffer has exited the underflow approaching state.

3. The electronic device according to claim 1, wherein the memory device comprises one or more dynamic random access memory (DRAM) devices.

4. The electronic device according to claim 1, wherein:
    the one or more first modules are configured to generate new output pixel data for the buffer while the display controller obtains previously generated output pixel data from the buffer for presentation via the display device; and
    the buffer does not store all of the first updated image at one time.

5. The electronic device according to claim 1, further comprising a pose estimation module arranged to, based on sensor data collected over time, generate predicted poses for an end user of the electronic device,
    wherein the one or more first modules are further configured to:
        obtain a first updated predicted pose of the end user from the pose estimation module corresponding to a first time that the first updated image will be presented via the display device; and
        process the received first portion of the image data to generate the first output pixel data based on the first updated predicted pose.

6. The electronic device according to claim 5, further comprising an image rendering module configured to generate the initial image based on an initial predicted pose of the end user and store the initial image in the memory device.

7. The electronic device according to claim 5, wherein the one or more first modules are further configured to:
    obtain a second updated predicted pose of the end user from the pose estimation module corresponding to a second time that a second updated image will be presented via the display device;
    identify a third portion of the image data stored in the memory device for use in generating third output pixel data for a second updated image; and
    in response to operating in the first operating mode:
        issue one or more second memory read commands via the interconnect to retrieve the third portion of the image data from the memory device;
        receive the third portion of the image data via the interconnect in response to the second memory read commands;
        process the received third portion of the image data to generate the third output pixel data based on the second updated predicted pose; and
        provide the third output pixel data to the buffer,
    wherein:
        the first updated image is presented via the display device during a first frame period, and
        the second updated image is presented via the display device during a second frame period different than the first frame period.

8. The electronic device according to claim 5, further comprising:
    the display device, wherein the display device is a head-mounted display (HMD); and
    one or more head-mounted sensors arranged to provide the sensor data.

9. The electronic device according to claim 1, further comprising a memory controller arranged to receive memory commands from a plurality of masters and configured to schedule and perform memory accesses of the memory device corresponding to the received memory commands via the interconnect, wherein:

the plurality of masters includes a first master;
the first master includes the one or more first modules;
the buffer monitoring circuit is further configured to determine the buffer is in an undercapacity state based at least on an amount of available data in the buffer being less than or equal to a second threshold, the second threshold being greater than the first threshold; and
the first master is configured to, based at least on the determination that the buffer is in the undercapacity state, initiate a temporary increase of a clock rate, a temporary increase of a bandwidth allocation for the first master, or a temporary increase of a priority level for the first master.

10. The electronic device according to claim 1, wherein the one or more first modules are further configured to:
identify a third portion of the image data stored in the memory device for use in generating the second output pixel data for the first updated image;
issue a second memory read command via the interconnect to retrieve the third portion of the image data from the memory device;
receive the third portion of the image data via the interconnect in response to the second memory read command; and
generate, based on the received third portion of the image data, an undegraded or partially degraded portion of the second output pixel data.

11. A method of presenting images, the method comprising:
receiving and storing output pixel data in a buffer;
providing the stored output pixel data to a display controller;
receiving, at the display controller, stored output pixel data from the buffer for presentation via a display device coupled to the display controller;
identifying a first portion of image data for an initial image stored in a memory device for use in generating first output pixel data for a first updated image;
in response to operating in a first operating mode:
issuing one or more first memory read commands via an interconnect to retrieve the first portion of the image data from the memory device;
receiving the first portion of the image data via the interconnect in response to the first memory read commands;
processing the received first portion of the image data to generate the first output pixel data; and
providing the first output pixel data to the buffer;
determining that the buffer is in an underflow approaching state based at least on an amount of available data in the buffer being less than or equal to a first threshold;
switching to a second operating mode based at least on the determination that the buffer is in the underflow approaching state;
identifying a second portion of the image data stored in the memory device for use in generating second output pixel data for the first updated image; and
in response to operating in the second operating mode:
generating the second output pixel data without issuing a memory read command via the interconnect to retrieve the second portion of the initial image while operating in the second operating mode; and
providing the second output pixel data to the buffer.

12. The method according to claim 11, further comprising:
determining that the buffer has exited the underflow approaching state based at least on an amount of available data in the buffer being greater than or equal to a second threshold; and
exiting the second operating mode based at least on the determination that the buffer has exited the underflow approaching state.

13. The method according to claim 11, wherein the memory device comprises one or more dynamic random access memory (DRAM) devices.

14. The method according to claim 11, further comprising generating new output pixel data for the buffer while obtaining, at the display controller, previously generated output pixel data from the buffer for presentation via the display device,
wherein the buffer does not store all of the first updated image at one time.

15. The method according to claim 11, further comprising:
obtaining, based on sensor data collected over time, a first updated predicted pose of an end user corresponding to a first time that the first updated image will be presented via the display device; and
processing the received first portion of the image data to generate the first output pixel data based on the first updated predicted pose.

16. The method according to claim 15, wherein:
the display device and the memory device are included in an electronic device; and
the method further comprises generating, at the electronic device, the initial image based on an initial predicted pose of the end user and storing the initial image in the memory device.

17. The method according to claim 15, further comprising:
obtaining, based on sensor data collected over time, a second updated predicted pose of the end user corresponding to a second time that a second updated image will be presented via the display device;
identifying a third portion of the image data stored in the memory device for use in generating third output pixel data for a second updated image;
presenting the first updated image via the display device during a first frame period;
presenting the second updated image via the display device during a second frame period different than the first frame period; and
in response to operating in the first operating mode:
issuing one or more second memory read commands via the interconnect to retrieve the third portion of the image data from the memory device;
receiving the third portion of the image data via the interconnect in response to the second memory read commands;
processing the received third portion of the image data to generate the third output pixel data based on the second updated predicted pose; and
providing the third output pixel data to the buffer.

18. The method according to claim 15, wherein:
the display device is included in an electronic device;
the display device is a see-through head-mounted display (HMD); and
the electronic device further includes one or more head-mounted sensors arranged to provide the sensor data.

19. The method according to claim 11, further comprising:
receiving, at a memory controller, memory commands from a plurality of masters, the plurality of masters including a first master;
scheduling and performing memory accesses of the memory device corresponding to the received memory commands via the interconnect;
determining that the buffer is in an undercapacity state based at least on an amount of available data in the buffer being less than or equal to a second threshold, the second threshold being greater than the first threshold; and
initiating, based at least on the determination that the buffer is in the undercapacity state, a temporary increase of a clock rate, a temporary increase of a bandwidth allocation for the first master, or a temporary increase of a priority level for the first master, wherein the one or more first memory read commands are issued by the first master.

20. The method according to claim 11, further comprising:
identifying a third portion of the image data stored in the memory device for use in generating the second output pixel data for the first updated image;
issuing a second memory read command via the interconnect to retrieve the third portion of the image data from the memory device;
receiving the third portion of the image data via the interconnect in response to the second memory read command; and
generating, based on the received third portion of the image data, an undegraded or partially degraded portion of the second output pixel data.

* * * * *